US010074206B1

(12) United States Patent
Ingegneri

(10) Patent No.: US 10,074,206 B1
(45) Date of Patent: Sep. 11, 2018

(54) NETWORK-OPTIMIZED GRAPHICS LIBRARY FOR VIRTUALIZED GRAPHICS PROCESSING

(71) Applicant: Amazon Technologies, Inc., Seattle, WA (US)

(72) Inventor: Gianpaolo Ingegneri, Messina (IT)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/603,341

(22) Filed: May 23, 2017

(51) Int. Cl.
```
G06T 15/00    (2011.01)
G09G 5/00     (2006.01)
G06T 1/20     (2006.01)
G06F 9/455    (2018.01)
G06F 9/50     (2006.01)
```

(52) U.S. Cl.
CPC ........ *G06T 15/005* (2013.01); *G06F 9/45558* (2013.01); *G06F 9/5077* (2013.01); *G06T 1/20* (2013.01); *G09G 5/003* (2013.01); *G06F 2009/45579* (2013.01); *G06F 2009/45595* (2013.01); *G06T 2200/04* (2013.01); *G09G 2370/022* (2013.01)

(58) Field of Classification Search
CPC ..... G06T 15/005; G06T 1/20; G06T 2200/04; G06F 9/45558; G06F 9/5077; G06F 2009/45579; G06F 2009/45595; G09G 5/003; G09G 2370/022
See application file for complete search history.

(56) References Cited

U.S. PATENT DOCUMENTS

| | | | |
|---|---|---|---|
| 9,069,622 B2 | 6/2015 | Post et al. |
| 9,098,323 B2 | 8/2015 | Mitra et al. |
| 2012/0154389 A1 | 6/2012 | Bohan et al. |
| 2014/0055466 A1 | 2/2014 | Petrov et al. |
| 2014/0176583 A1 | 6/2014 | Abiezzi et al. |
| 2015/0116335 A1 | 4/2015 | Chen et al. |
| 2015/0220354 A1 | 8/2015 | Nair, Sr. |
| 2015/0370589 A1 | 12/2015 | Bidarkar et al. |

OTHER PUBLICATIONS

"Nice DCV Administration Guide," version 2014.0, Nice s.r.l., Asti, Italy, Jul. 2015. Source: https://www.nice-software.com/download/nice-dcv-2014#documentation, pp. 1-96.

(Continued)

*Primary Examiner* — Maurice L McDowell, Jr.
(74) *Attorney, Agent, or Firm* — Robert C. Kowert; Meyertons, Hood, Kivlin, Kowert & Goetzel, P.C.

(57) ABSTRACT

Methods, systems, and computer-readable media for a network-optimized graphics library for virtualized graphics processing are disclosed. An application is executed on a computing device having a virtual GPU attached over a network. The virtual GPU is implemented using a physical GPU in a GPU server. The computing device comprises an intermediate driver associated with an intermediate graphics library. In association with execution of the application, one or more calls to the intermediate graphics library are sent to the GPU server over the network. At the GPU server, the one or more calls are translated to one or more equivalent calls to a second graphics library. The one or more equivalent calls are executed on the virtual GPU using a driver associated with the second graphics library, and output is generated based (at least in part) on execution of the one or more equivalent calls.

20 Claims, 19 Drawing Sheets

(56) References Cited

OTHER PUBLICATIONS

Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.
Antonio J. Peña, Carlos Reaño, Rafael Mayo, Enrique S. Quintana-Orti, and José Duato. "A complete and efficient CUDA-sharing solution for HPC clusters." In Parallel Computing Journal, vol. 40, Issue 10, pp. 574-588. Preprint submitted to parallel Computing Sep. 2, 2014. http://www.sciencedirect.com/science/article/pii/S0167819114001227, pp. 1-28.

NETWORK-OPTIMIZED GRAPHICS LIBRARY FOR VIRTUALIZED GRAPHICS PROCESSING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
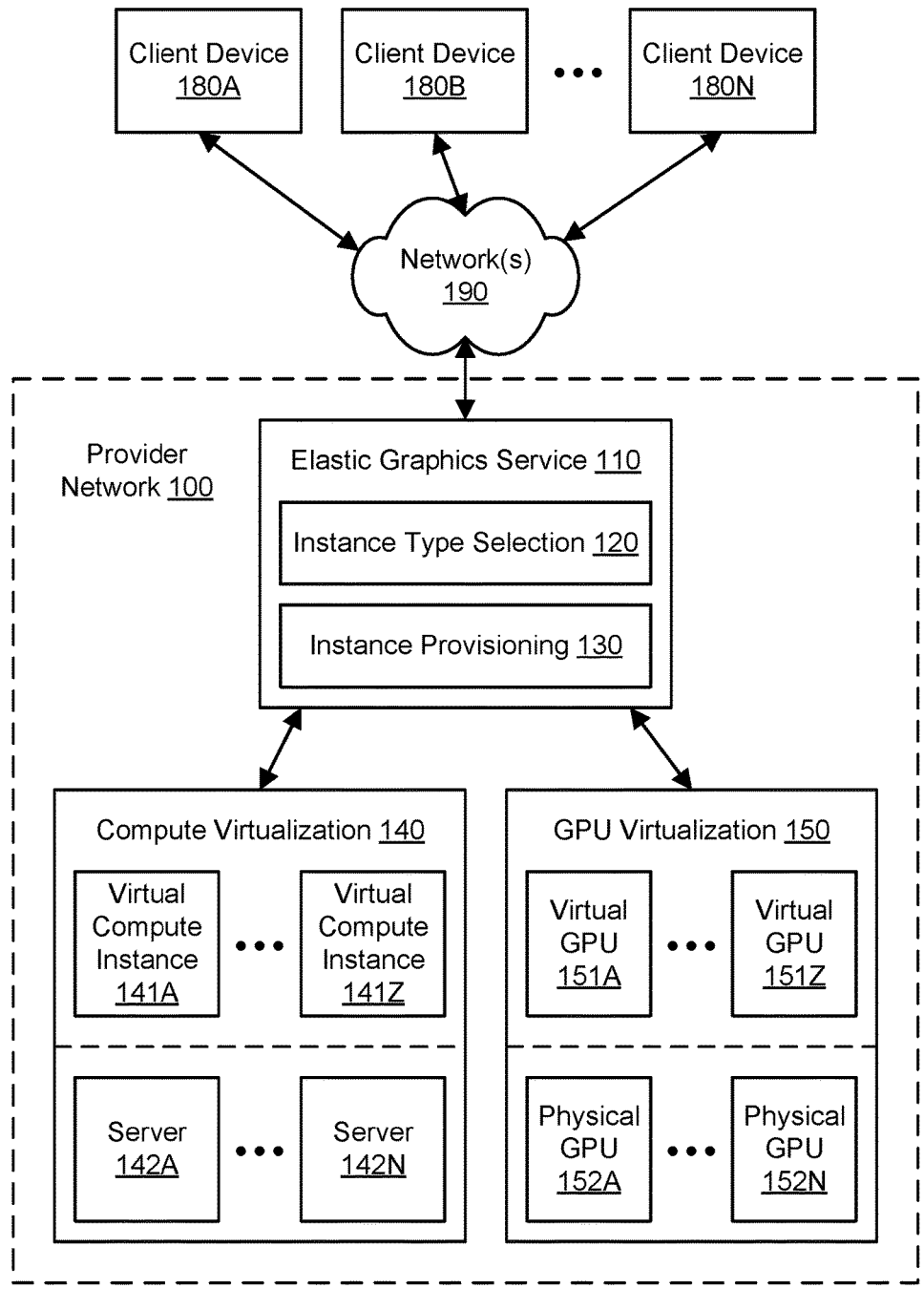
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for a network-optimized graphics library for virtualized graphics processing are described. Using the techniques described herein, a computing device may be provisioned, and a virtual graphics processing unit (GPU) may be attached to the computing device to provide virtualized graphics processing over a network connection. The virtual GPU may be implemented in a GPU server in a multi-tenant provider network. The computing device may implement a virtual compute instance in the provider network. The computing device, also referred to as an application host, may be configured to execute an application using the virtualized graphics processing provided by the virtual GPU. One or more graphics libraries may be installed on the computing device. These local graphics libraries, such as versions of Direct3D or OpenGL, may include sets of graphics functions that are offered to applications. In one embodiment, the computing device includes a network-optimized graphics library, also referred to herein as an intermediate library. Calls made by an application may be made directly to the network-optimized graphics library or may be made to a different graphics library and then translated to a form associated with the network-optimized graphics library. While expressed in the form associated with the intermediate library, the calls may be serialized and sent over a network from the computing device to the GPU server in a manner that reduces network usage in comparison to other graphics libraries, such as Vulkan. The calls may be held in a command buffer prior to being sent. The GPU server that implements the virtual GPU may include a driver associated with another graphics library, e.g., Vulkan. At the GPU server, the calls received over the network may be translated to equivalent calls in this other graphics library and may then be executed using the virtual GPU. The translation may include the creation of data structures that were not passed over the network in order to conserve bandwidth. In this manner, the GPU server may be implemented using a powerful, cross-platform library such as Vulkan, the application hosts may use any suitable graphics libraries as desired by application developers, and an intermediate graphics library may translate calls between the two devices for optimized network usage.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of servers 142A-142N, also referred to as physical compute instances. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying servers 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the servers 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 17), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner. The provider network 100 may thus represent a multi-tenant provider network.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 17.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 17:
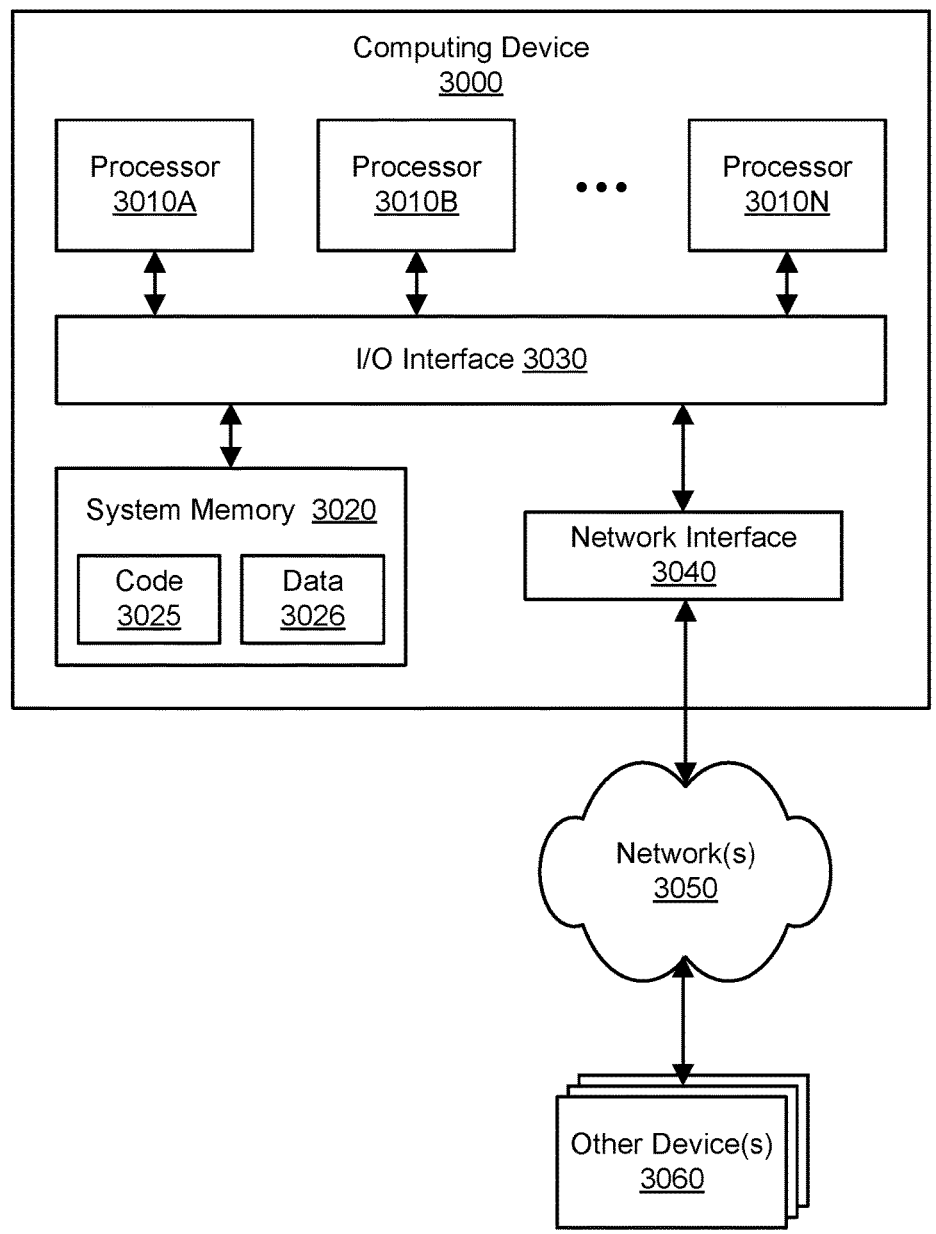
FIG. 17 illustrates an example computing device that may be used in some embodiments.

The provider network 100 may include a plurality of computing devices, any of which may be implemented by the example computing device 3000 illustrated in FIG. 17. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although servers 142A through 142N are shown for purposes of example and illustration, it is contemplated that different quantities and configurations of servers may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
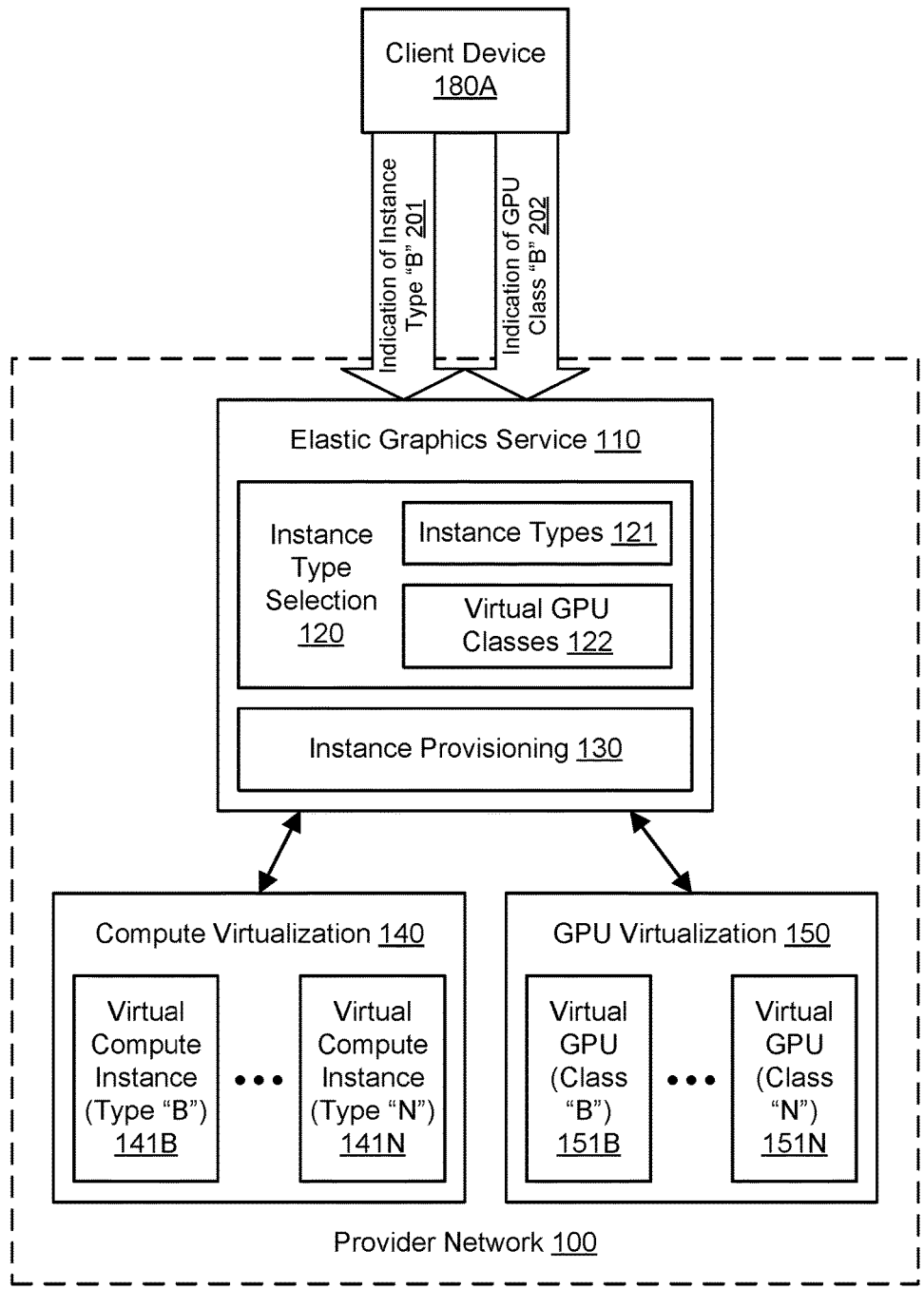
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
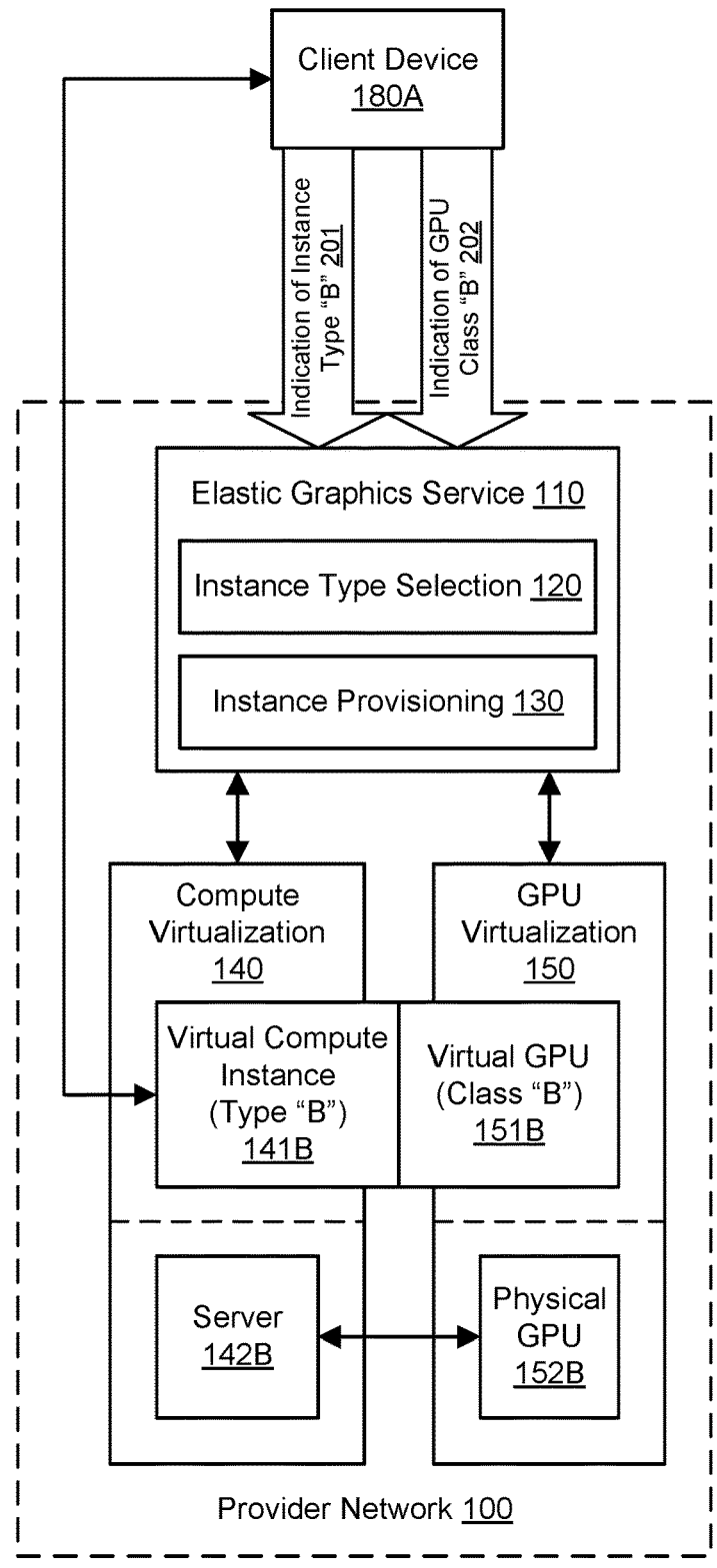
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a server 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying server for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a server 142B may communicate with a physical GPU 152B, e.g., over a network. The physical GPU 152B may be located in a different computing device than the server 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
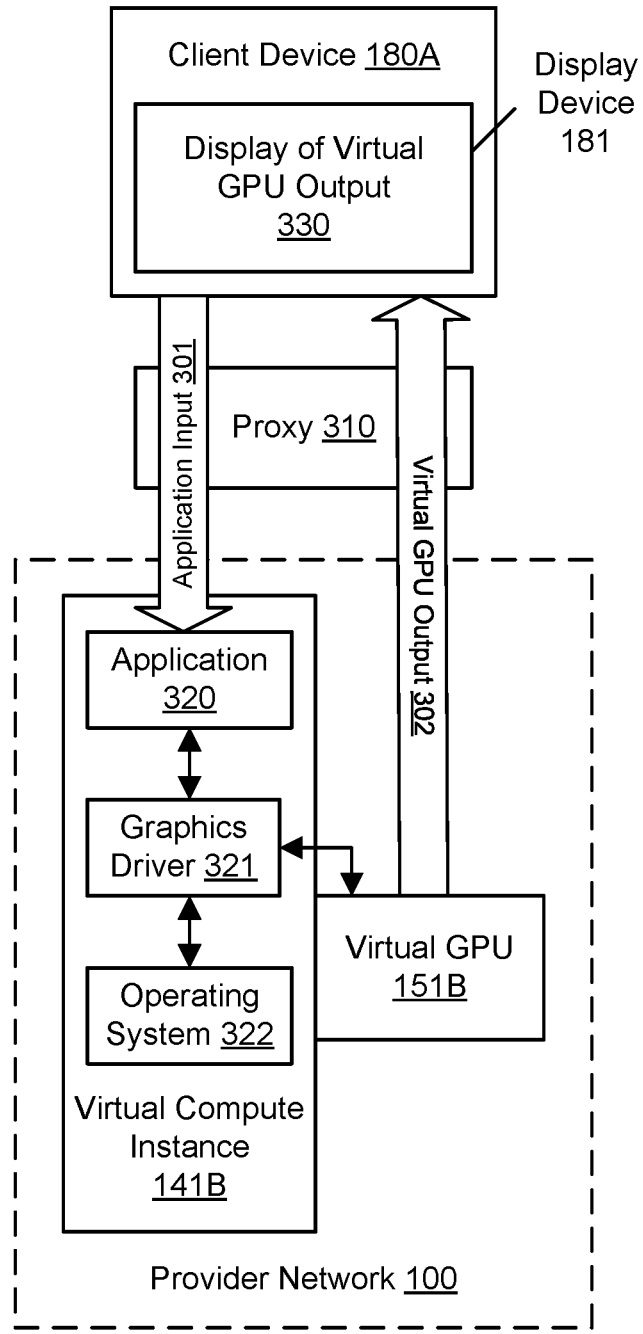
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying server 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose GPU computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
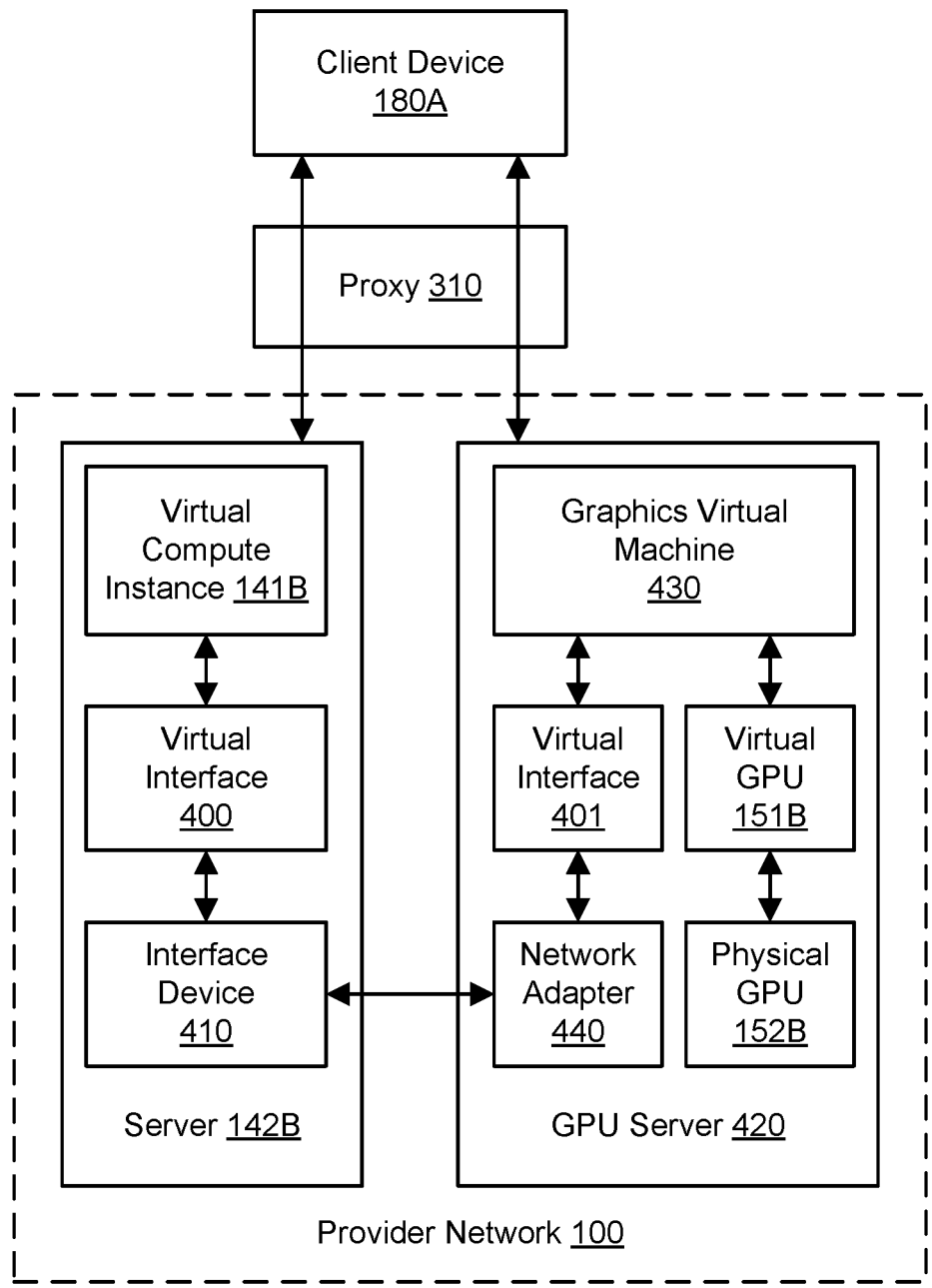
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a server 142B, and the virtual GPU 151B attached to that instance 141B may be implemented using a separate and distinct computing device termed a GPU server 420, also referred to as a graphics server or graphics appliance. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the GPU server 420 (and thus with the physical GPU 152B) over a network. The interface device 410 may be implemented in any suitable manner, e.g., as an expansion card (such as a PCI Express card) or attached peripheral device for the server 142B. The interface device 410 may use single root I/O virtualization to expose hardware virtual functions to the virtual compute instance 141B. In one embodiment, the server 142B may implement a plurality of virtual compute instances, each with its own virtual interface, and the virtual compute instances may use the interface device 410 to interact with the corresponding virtual GPUs on one or more GPU servers. The server 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the GPU server 420, and the GPU server 420 may execute the commands on behalf of the interface device. The GPU server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The GPU server 420 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the GPU server 420 may implement a plurality of virtual GPUs (such as virtual GPU 151B) using one or more physical GPUs (such as physical GPU 152B), and the virtual GPUs may interact with the corresponding virtual compute instances on one or more servers over a network. The GPU server 420 may communicate with the proxy 310 using a suitable remoting protocol, e.g., to send data to and receive data from the client device 180A. For example, the GPU server 420 may generate virtual GPU output based on the commands sent from the interface device 410. The virtual GPU output may be provided to the client device 180A through the proxy 310, e.g., from the server 142B or GPU server 420.

Figure 5:
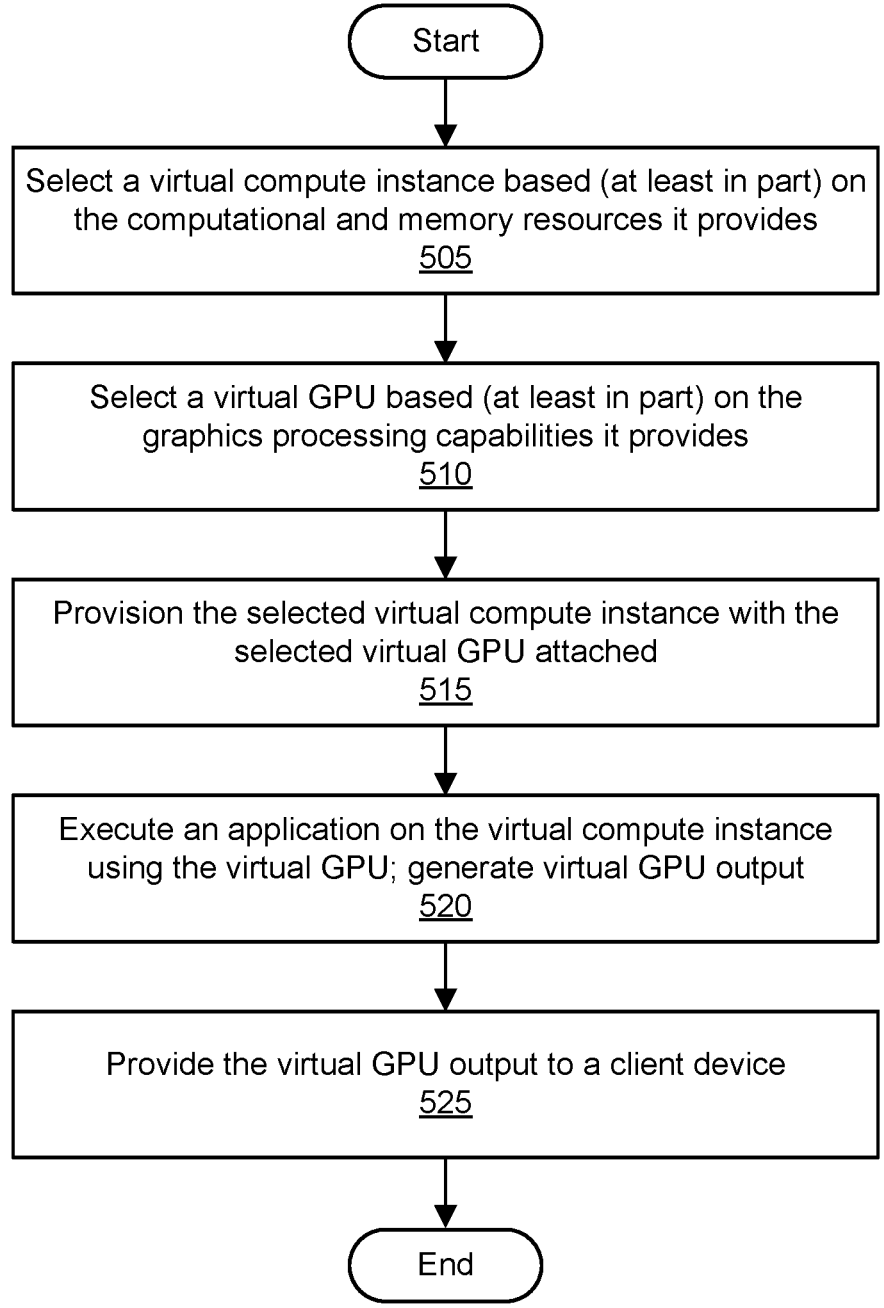
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different physical compute instance may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Physical compute instance(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, application-specific techniques may be used with the techniques for virtualized graphics processing described herein. A virtual compute instance may be provisioned and may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

Graphics Library Virtualization

Figure 6:
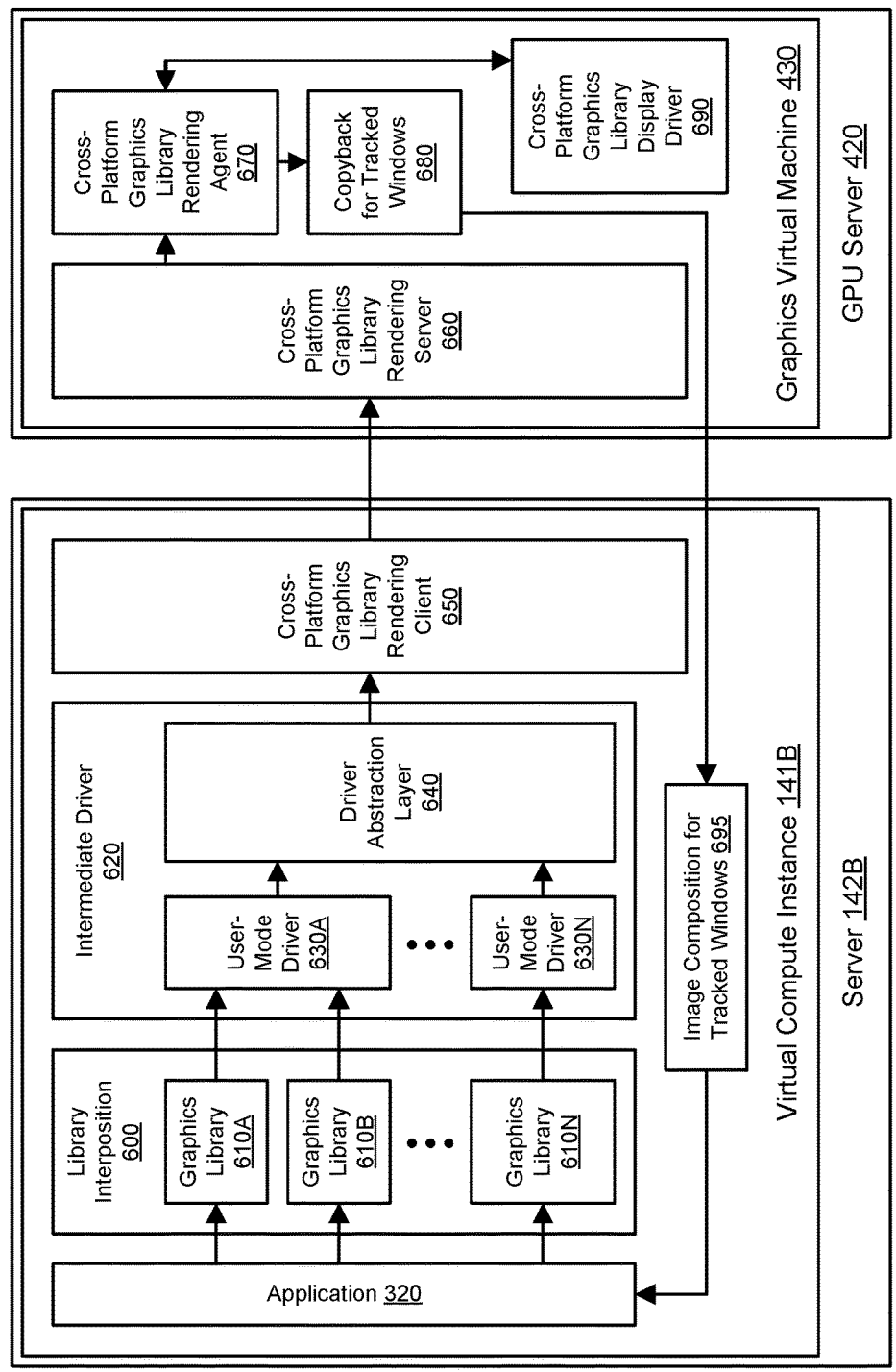
FIG. 6 illustrates an example system environment for graphics library virtualization for virtualized graphics processing, according to one embodiment.

FIG. 6 illustrates an example system environment for graphics library virtualization for virtualized graphics processing, according to one embodiment. Using graphics library virtualization, calls to a graphics library (also referred to as a source library) on the virtual compute instance may be translated to calls to a different graphics library (also referred to as a target library) associated with the virtual GPU. As discussed above with respect to FIG. 1 through FIG. 5, a virtual compute instance 141B implemented on top of a server 142B may be provisioned with an attached virtual GPU 151B. The virtual GPU 151B may be included in a GPU server 420 that implements a graphics virtual machine 430. After the virtual compute instance 141B is provisioned with the attached virtual GPU 151B, the client device 180A may use the provisioned instance and virtual GPU to perform any suitable tasks, e.g., based on input from the client device. For example, the virtual compute instance 141B may execute a particular application 320. The application 320 may be selected or provided by the client. The virtual compute instance 141B may also be configured with a particular operating system 322 that provides support for the application 320.

Additionally, the virtual compute instance 141B may be configured with one or more graphics libraries. A graphics library may include a set of graphics functions, calls, or commands that can be invoked by other software components on the virtual compute instance 141B, such as one or more processes of the application 320. A graphics library may offer a graphics application programming interface (API), and a graphics library may sometimes be referred to as a graphics API. As shown in the example of FIG. 6, the virtual compute instance 141B may include graphics libraries 610A and 610B through 610N. The graphics libraries 610A-610N may be referred to as local graphics libraries, in contrast to any graphics libraries associated with the remote GPU server 420. The term "graphics library" may include any set of functions, calls, or commands that are ultimately executed or implemented using a GPU, even if one or more of the functions, calls, or commands do not involve generating displayable output. The graphics libraries 610A-610N may include any suitable graphics libraries. For example, graphics libraries 610A and 610B may represent versions of Direct3D, such as Direct3D 9, Direct3D 10, Direct3D 11, and so on. As another example, graphics library 610N may represent a version of OpenGL. In some embodiments, the graphics libraries may include one or more general-purpose GPU (GPGPU) computing libraries such as CUDA and/or OpenCL. Some of the local graphics libraries, such as any Direct3D libraries, may be specific to a particular platform (e.g., to a particular operating system family) associated with the virtual compute instance 141B and/or server 142B. Using some of the local graphics libraries without graphics library virtualization, an application may execute many getter and setter functions that can generate many round-trip delays between the application host and the GPU server.

The GPU server 420 that includes the virtual GPU 151B may include a driver 690 associated with a different graphics library, such as Vulkan. The different graphics library may have a relatively slim interface and/or a limited set of functions, pipeline state objects, and command queues similar to those of its display driver. The graphics library associated with the virtual GPU may represent a cross-platform graphics library that is available on a variety of computing platforms (e.g., on different families of operating systems and/or different families of computing hardware). The graphics library associated with the GPU server 420 and the virtual GPU 151B may be referred to as a remote graphics library, a target graphics library, or a cross-platform graphics library. The sets of functions offered by the local graphics libraries may differ (at least in part) from the set of functions offered by the cross-platform or remote graphics library of the GPU server 420. However, many of the functions in the local graphics libraries may have equivalent functions in the cross-platform or remote graphics library of the GPU server 420. On the virtual compute instance, an intermediate driver 620 may translate calls associated with one or more of the local graphics libraries (such as Direct3D or OpenGL) to the equivalent calls associated with a different graphics library (such as the cross-platform Vulkan library) implemented by the GPU server. Equivalent functions or equivalent calls may represent functions or calls that typically produce the same or similar results even though the form of the call may differ. The equivalent calls may be sent over a network from the server 142B to the GPU server 420 for execution on the attached virtual GPU using the driver 690 associated with the cross-platform graphics library. Converting Direct3D or OpenGL calls to Vulkan commands may reduce the round-trip delays and serialization overhead between the two hosts.

In this manner, the GPU server 420 may be implemented using any platform supported by the cross-platform graphics library while providing graphics processing (potentially including accelerated two-dimensional graphics processing and/or accelerated three-dimensional graphics processing) for an application host having one or more different (and potentially platform-specific) graphics libraries. The virtualization of local graphics libraries as described herein may reduce the serialization overhead, reduce the round-trip delays, and make a better use of bandwidth between the two hosts. The portability of the remote graphics library (e.g., Vulkan) may allow the provider network 100 to offer an elastic graphics service on various platforms, such as Windows and/or Linux, with a large range of supported graphics cards.

In one embodiment, one or more native graphics libraries on the virtual compute instance may be replaced with alternative versions in a process referred to as interposition. The native libraries may be supplied by a vendor of the physical GPU. When the application 320 attempts to load a native graphics library, the library interposition functionality 600 may interpose an alternative version instead of the native version to permit graphics library virtualization. In various embodiments, the library interposition 600 may be performed using various techniques. Using a first technique, a custom version of the display driver may be implemented and installed instead of the display driver supplied by the hardware vendor. Using a second technique, a filter driver may be installed that makes the application process 320 load the alternative version of the library instead of the native one, e.g., during a LoadLibrary call made by the application. The names of the native library and the alternative library may be switched. Using a third technique, the application process 320 may be injected with an external library (e.g., a dynamic link library) which detours the graphics library's calls by changing the import address table (IAT) of the process. The choice of interposition technique may vary according to the use case, e.g., based on the architecture of the library that will be interposed. For example, for Direct3D, injection of an external library or direct installation of a custom display driver may be superior to using a filter driver. As another example, when coexistence with the hardware vendor driver is desired, and the library API is small (as in a user-mode display driver), the injection technique may be used. As yet another example, when the library API is large (like OpenGL), the filter driver may be used.

In one embodiment, the application 320 may call one of the graphics libraries 610A-610N, e.g., to render all or part of a 2D or 3D scene. The called library may, for example, implement the Direct3D or OpenGL API. To perform graphics library virtualization for such libraries, an intermediate transition may be implemented between the local graphics library on the virtual compute instance 141B and the remote graphics library associated with the graphics virtual machine 430. In one embodiment, an intermediate driver 620 may implement such a transition. The intermediate driver 620 may include user-mode display drivers 630A-630N corresponding to the various graphics libraries 610A-610N. For example, if the graphics libraries 610A and 610B represent Direct3D libraries, then the user-mode driver 630A may represent a user-mode display driver for Direct3D. In one embodiment, the native versions of the Direct3D graphics libraries may be used with a custom version 630A of a Direct3D user-mode display driver (UMD).

The graphics libraries 610A-610N may represent runtime APIs. The runtime APIs may provide a standard interface to use the GPU without requiring the application 320 to have knowledge of the hardware being used and the underlying command buffer system. A runtime API may keep track of the current state, validate parameters, perform error and consistency checking, manage user-visible resources, and/or validate shader code and shader linkage. On Windows, a graphics acceleration runtime API may be represented by a dynamic library which lies in the user space. For example, OpenGL may expose the opengl32.dll library that also represents the Installable Client Driver (ICD) that sends graphics commands directly to the kernel display driver through the D3DKMT API exposed by GDI32. As another example, Direct3D may be represented by a set of libraries (d3d9.dll, d3d10.dll, d3d11.dll, dxgi.dll) where the draw calls are translated into a series of graphics commands for an intermediate driver that is called the user-mode display driver (UMD).

The native UMD for Direct3D may represent a dynamic library which is distributed by the GPU vendor (e.g., nvd3dum.dll by NVIDIA or atiumd*.dll by AMD). The UMD may run in the same context and address space of the API runtime and may have no elevated privileges. The UMD may implement a lower-level API, the device driver interface (DDI), which is similar to the 3D API but more explicit about synchronization and memory management. The UMD may provide per-process command buffers that are vendor-dependent and may contain the actual commands given to the GPU. The shaders may be compiled in runtime, and the driver may inject custom code to implement specific functionality that does not translate directly to hardware. When the command buffer is validated for the GPU, it may be submitted to a kernel-mode display driver (KMD).

To share the GPU among different processes, a mechanism may be used to ensure not only that the commands are executed in order but also that the GPU can be used by the processes and that no data corruption is introduced during the scheduling. These operations may be implemented by a device driver executing in kernel mode (KMD), where the scheduler and the main command buffer are used to talk to the GPU. The command processor may read from the stream, decode the commands, and feed a threads/stream scheduler. The kernel driver scheduler may read from each individual per-process command buffer and moves them to direct memory access (DMA) buffers. A GPU may include a DMA controller and a memory management unit (MMU). The DMA buffer may allow the GPU to talk directly to host RAM to fetch and write data without CPU intervention. The MMU may virtualize GPU memory and host memory and offers some memory protection. The DMA buffers may be put into the main command buffer, which may be a ring buffer (first-in, first-out) that is filled by the CPU and read by the GPU until it is drained. If the ring is empty (e.g., if write and read pointers are equal), then the GPU may stall and wait until has something to do. If the CPU fills the entire buffer, it may be required to wait for the GPU to finish and create free space in the buffer.

The host and the graphics controller (command processor) may be connected through the ring buffer (RB). The RB may be initialized with a fixed buffer size, and both write and read pointers may be set to zero (empty buffer). The driver may add packets into the RB and update the write pointer register inside the device. When the device reads packets, it may update the read pointer. Updating both pointers may incur some overhead that can be mitigated by only updating these registers when some block of data has been consumed (e.g., by grouping packets in blocks) instead of doing so for each packet. Some command types called fences may be embedded into the command stream and used by the GPU to make the CPU understand when some commands have been processed. In this way, the CPU can access graphics arrays and update them when the GPU is not bounded.

Using the techniques described herein, the native Direct3D library may continue to work with its Component Object Model (COM) aspect believing that the user-mode display driver 630A is the one provided by the hardware vendor and not the custom replacement. In one embodiment, the set of calls extracted from the complex interactions of COM interfaces may be translated to the graphics commands exposed by a component that is referred to as the driver abstraction layer 640. The driver abstraction layer 640 may anchor the user-mode driver(s) to the remote graphics library (e.g., Vulkan). The driver abstraction layer 640 may collect the graphics calls and convert them to the equivalent calls for the version of the graphics library (e.g., Vulkan) associated with the graphics virtual machine 430 and/or GPU server 420. In one embodiment, the Direct3D program shaders may also be translated for the intermediate language (e.g., SPIR-V) associated with the remote graphics library (e.g., Vulkan).

Similarly, if the graphics library 610N represents an OpenGL library, then the user-mode driver 630N may represent a user-mode display driver for OpenGL. The OpenGL graphics calls may collected by a user-mode display driver 630N that implements a state tracker and translates the graphics calls to graphics commands for the driver abstraction layer 640. The driver abstraction layer 640 may collect the OpenGL graphics calls and convert them to the equivalent calls for the version of the graphics library (e.g., Vulkan) associated with the graphics virtual machine 430 and/or GPU server 420. In one embodiment, the OpenGL program shaders may also be translated for the intermediate language (e.g., SPIR-V) associated with the remote graphics library (e.g., Vulkan).

The Vulkan API may provide an intermediate language such as SPIR-V to describe both graphical shaders and compute kernels in a machine-independent manner. In one embodiment, OpenCL and Vulkan may share this SPIR-V language, and so OpenCL compute kernels (also referred to as compute shaders) may be translated in a similar manner as described for OpenGL. In general, compute commands exposed by the OpenCL API may be translated to equivalent Vulkan commands (or commands in another suitable cross-platform library), and the translated commands may be sent to the GPU server 420 as discussed herein. In one embodiment, OpenCL may be used as the cross-platform library rather than Vulkan, such that the GPU server 420 may use OpenCL to drive the virtual GPU for GPGPU implementations.

As discussed above for interposition of libraries such as Direct3D and OpenGL, a GPGPU library such as CUDA may be interposed using similar techniques. The interposed CUDA library may collect the compute calls to an intermediate driver (e.g., Vulkan or OpenCL). The intermediate driver may translate those calls to the client library to calls to the target library implemented on the GPU server 420, e.g., by translating from the CUDA-specific language to SPIR-V. The intermediate driver may then send the translated calls to an external agent (analogous to the rendering agent) on the GPU server for execution on the virtual GPU using a cross-platform library such as Vulkan or OpenCL. The local library may provide methods to load, compile, and run compute kernels. The compute kernels may also be translated for execution on the GPU server 420, e.g., by a translator implemented by the intermediate driver.

A rendering client 650 may be configured to handle the translated (e.g., Vulkan) calls and may be referred to as a cross-platform graphics library rendering client or simply as a Vulkan rendering client. The rendering client 650 may also be referred to as a command streamer. The rendering client 650 may serialize the translated calls and send them over the network to the GPU server 420. The rendering server 660 on the virtual machine 430 may accept connection requests from the rendering client 650 and may open the rendering agent process 670 to establish a connection between the calling component and the launched one. The rendering server 660 may be referred as a cross-platform graphics library rendering server or simply as a Vulkan rendering server. The rendering server may close the rendering agent process 670 if the application 320 has been terminated or the connection is lost. When the connection has been created, the translated calls may be sent by the client library to the rendering agent process 670. The rendering agent 670 may be configured to handle the translated (e.g., Vulkan) calls and may be referred to as a cross-platform graphics library rendering agent or simply as a Vulkan rendering agent. The rendering agent 670 may communicate with the display driver 690 to execute the calls, e.g., to render all or part of scene to a frame buffer bound to the application window. The display driver 690 may be configured to handle the translated (e.g., Vulkan) calls and may be referred to as a cross-platform graphics library display driver or simply as a Vulkan display driver. The resulting output may be captured in the copyback block 680 and sent back over the network to an image composition component 695 on the virtual compute instance 141B. The image composition for tracked windows 695 may draw the image in a window associated with the application 320. Alternatively, the output of executing the calls on the virtual GPU may be provided to another external component such as the client device 180A. For a GPGPU implementation, the rendering client 650 and rendering agent 670 may be referred to as a compute client and compute agent, and the compute client and compute agent may serve similar roles as the rendering client and rendering agent.

In one embodiment, the intermediate driver 620 may convert state functions from the user-mode driver (UMD) associated with a local graphics library (e.g., Direct3D) to the form expected by the remote library (e.g., Vulkan). In one embodiment, a user-mode display driver dynamic link library (DLL) may export the OpenAdapter function and supply pointers to adapter-specific functions through members of the D3DDDI_ADAPTERFUNCS structure when the runtime calls OpenAdapter. The UMD associated with Direct3D may have different versions corresponding to the different versions of Direct3D (e.g., Direct3D 9, 10, 11, and so on). For example, Direct3D9 may use the base version of the UMD (d3dumddi with OpenAdapter), while Direct3D10 may use version 10 of the UMD (d3d10umddi with OpenAdapter10). The Direct3D runtime may call the CreateDevice function from the pfnCreateDevice member of the D3DDDI_ADAPTERFUNCS to create a display device that is used to handle a collection of rendering states. The UMD DLL may supply pointers to its display-device-specific functions through members of the D3DDDI_DEVICEFUNCS structure when the runtime calls the CreateDevice function. Examples of equivalences between Direct3D state functions (associated with the Direct3D9 D3DDDI_DEVICEFUNCS structure) and Vulkan commands are shown as follows:

PFND3DDDI_SETVIEWPORT→vkCmdSetViewport
PFND3DDDI_SETSCISSORRECT→vkCmdSetScissor
PFND3DDDI_SETZRANGE→vkCmdSetDepthBounds
PFND3DDDI_CLEAR→vkCmdClearColorImage, vkCmdClearDepthStencilImage
PFND3DDDI_BLT→vkCmdBlitImage
PFND3DDDI_COLORFILL, PFND3DDDI_DEPTHFILL→vkCmdFillBuffer
PFND3DDDI_DRAWPRIMITIVE→vkCmdDraw, vkCmdDrawIndirect
PFND3DDDI_DRAWINDEXEDPRIMITIVE→vkCmdDrawIndexed, vkCmdDrawIndexedIndirect In one embodiment, most of the Direct3D UMD state functions may be translated by calling the already existing Vulkan commands while readapting the arguments and the resources. In one embodiment, the driver abstraction layer 640 may select the most suitable version of the remote graphics library (e.g., Vulkan) or any other graphics library for the conversion. For example, PFND3DDDI_DRAWPRIMITIVE may be converted inside the Direct3D user-mode driver (e.g., dcvumdd3d.d11) 630A to a generic dcvCmdDraw that could call respectively vkCmdDraw if it's using Vulkan or ID3D12GraphicsCommandList::DrawInstanced if it's using Direct3D 12. In one embodiment, the local graphics library (e.g., Direct3D) may also be implemented on the graphics virtual machine 430, and that library may be used to render the calls to save the performance costs of the intermediate conversion of the program shader.

Figure 7:
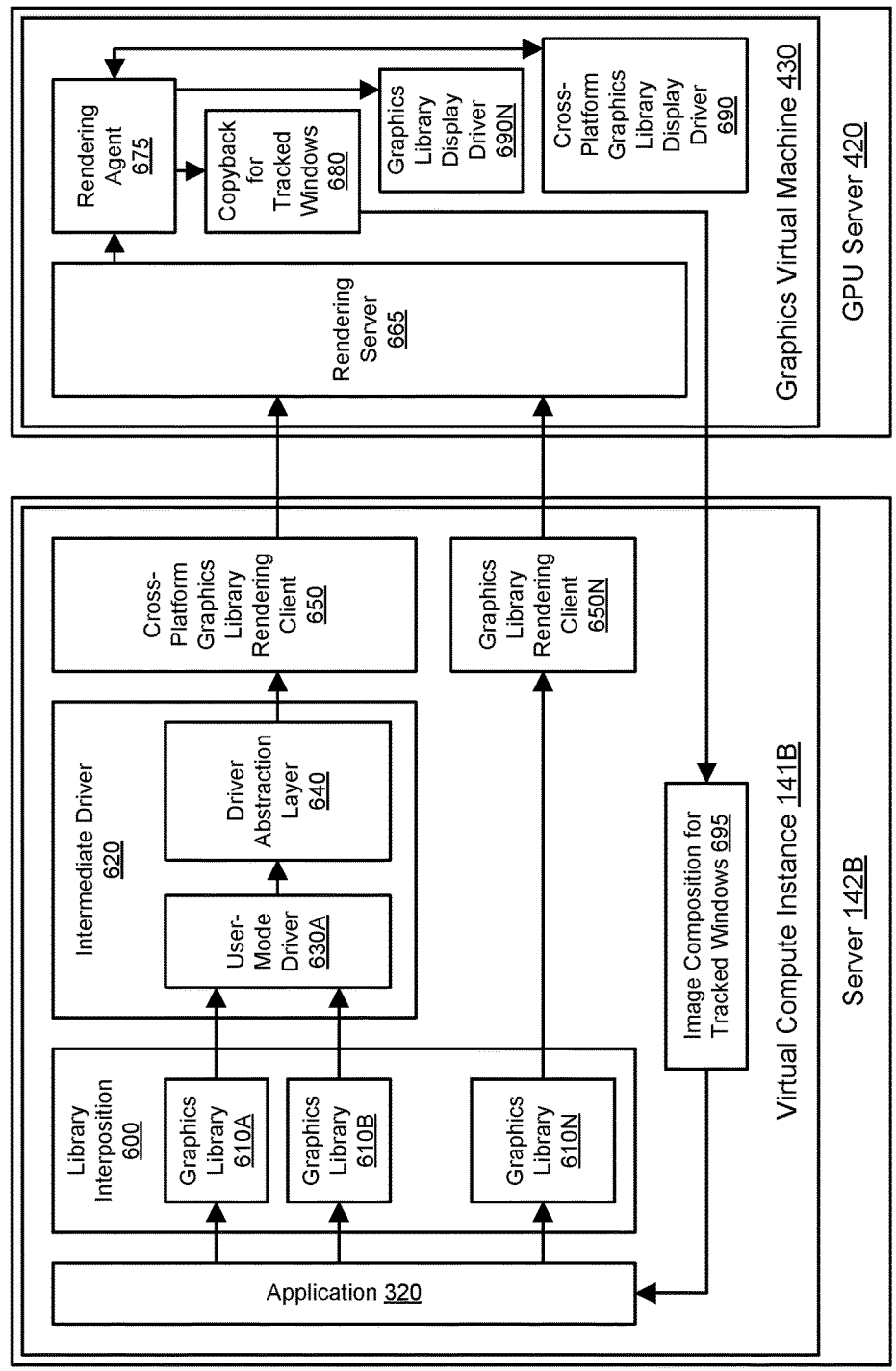
FIG. 7 illustrates further aspects of the example system environment for graphics library virtualization for virtualized graphics processing, including bypassing the intermediate driver for calls to a particular graphics library with an associated graphics driver on the GPU server, according to one embodiment.

FIG. 7 illustrates further aspects of the example system environment for graphics library virtualization for virtualized graphics processing, including bypassing the intermediate driver for calls to a particular graphics library with an associated graphics driver on the GPU server, according to one embodiment. In one embodiment, the graphics library virtualization may provide virtualization of one or more libraries such as Direct3D while using a different technique to support calls to one or more libraries such as OpenGL. For example, the conversion of OpenGL commands to Vulkan commands may be more complicated and expensive than the conversion of Direct3D commands. In such circumstances, calls to the graphics libraries 610A-610B may be virtualized while calls to the graphics library 610N may bypass the virtualization techniques described herein.

As shown in the example of FIG. 7, calls to the graphics library (e.g., OpenGL library) 610N may be passed directly to a rendering client 650N associated with that library. A rendering client 650N may be configured to handle the original, untranslated (e.g., OpenGL) calls and may be referred to as a cross-platform graphics library rendering client or simply as an OpenGL rendering client. The rendering client 650 may serialize the translated calls and send them over the network to the GPU server 420. The rendering server 665 on the virtual machine 430 may accept connection requests from the rendering client 650N and may open the rendering agent process 675 to establish a connection between the calling component and the launched one. The rendering server may close the rendering agent process 675 if the application 320 has been terminated or the connection is lost. When the connection has been created, the translated calls are sent by the client library to the rendering agent process 675. The rendering agent 675 may be configured to handle both untranslated (e.g., OpenGL) and translated (e.g., Vulkan) calls. For Vulkan calls, the rendering agent 675 may communicate with the display driver 690 to execute the calls, e.g., to render all or part of scene to a frame buffer bound to the application window. For OpenGL calls, the rendering agent 675 may communicate with a different display driver 690N to execute the calls, e.g., to render all or part of scene to a frame buffer bound to the application window. The display driver 695N may be configured to handle OpenGL calls and may be referred to as an OpenGL display driver. The resulting output may be captured in the copyback block 680 and sent back over the network to an image composition component 695 on the virtual compute instance 141B. The image composition for tracked windows 695 may draw the image in a window associated with the application 320. Alternatively, the output of executing the calls on the virtual GPU may be provided to another external component such as the client device 180A.

Figure 8:
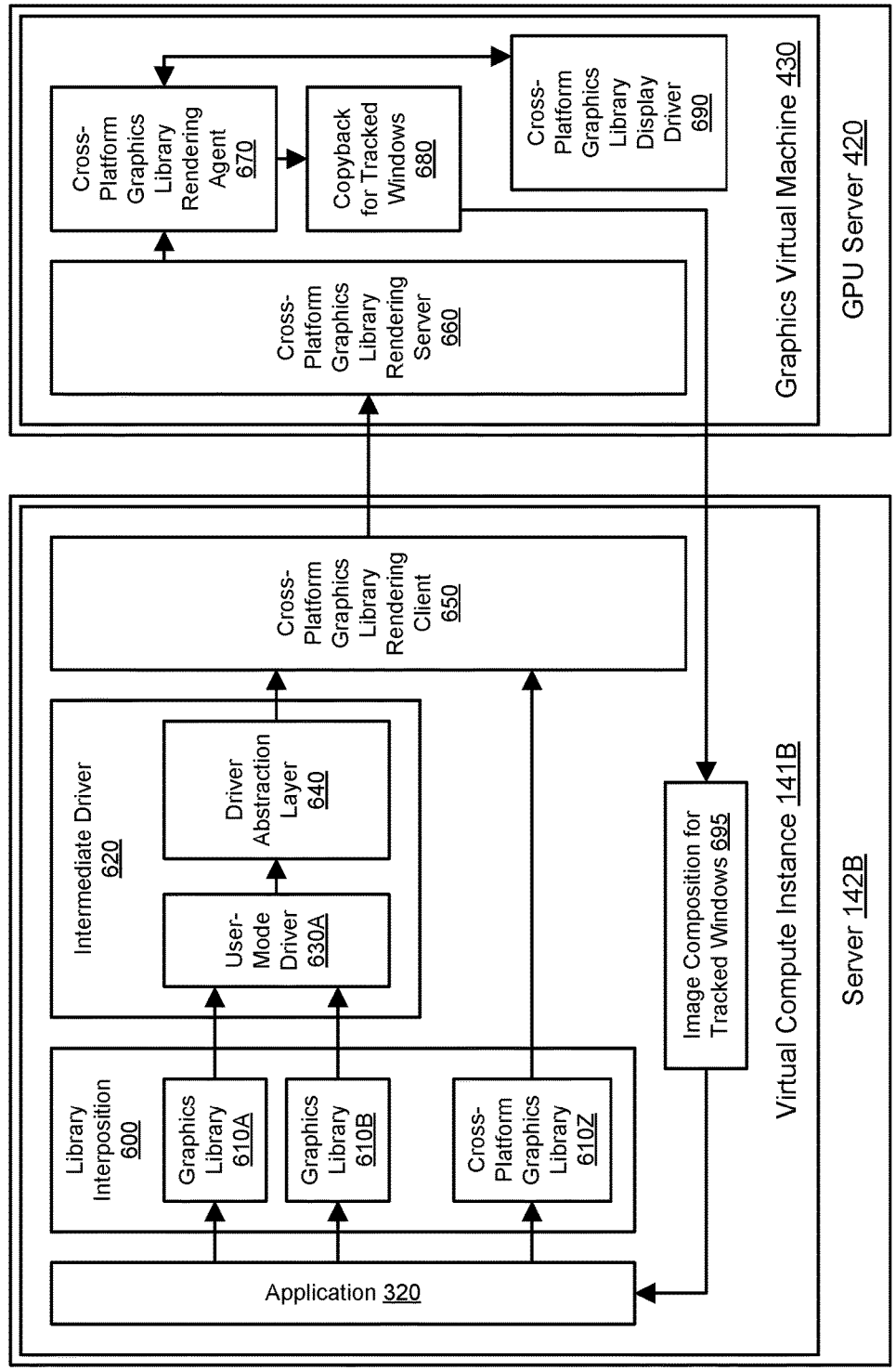
FIG. 8 illustrates further aspects of the example system environment for graphics library virtualization for virtualized graphics processing, including bypassing the intermediate driver for calls to a cross-platform graphics library with an associated cross-platform graphics driver on the GPU server, according to one embodiment.

FIG. 8 illustrates further aspects of the example system environment for graphics library virtualization for virtualized graphics processing, including bypassing the intermediate driver for calls to a cross-platform graphics library with an associated cross-platform graphics driver on the GPU server, according to one embodiment. In one embodiment, the library interposition 600 may intercept Vulkan API functions when they are called by the processes running on the application host. The calls may be serialized, collected into data buffers, and sent to a GPU server 420 (e.g., running on Windows or Linux) that executes the graphics calls using Vulkan. In one embodiment, the application 320 may call a graphics library 610Z associated with the driver on the GPU server 420, e.g., to render all or part of a 2D or 3D scene. The library 610Z may be referred to as a cross-platform graphics library and may, for example, implement the Vulkan API. In this case, the rendering calls from the application 320 to the graphics library 610Z may be passed to the rendering client 650. In one embodiment, the intermediate driver 620 may be bypassed in passing the calls from the library 610Z to the rendering client 650. Again, the rendering client 650 may be configured to handle Vulkan calls and may be referred to as a cross-platform graphics library rendering client or simply as a Vulkan rendering client. The rendering client 650 may serialize the calls and send them over the network to GPU server 420.

The rendering server 660 on the virtual machine 430 may accept connection requests from the rendering client 650 and may open the rendering agent process 670 to establish a connection between the calling component and the launched one. The rendering server may close the rendering agent process 670 if the application 320 has been terminated or the connection is lost. When the connection has been created, the translated calls are sent by the client library to the rendering agent process 670. The rendering agent 670 may be configured to handle Vulkan calls and may be referred to as a cross-platform graphics library rendering agent or simply as a Vulkan rendering agent. The rendering agent 670 may communicate with the display driver 690 to execute the calls, e.g., to render all or part of scene to a frame buffer bound to the application window. The display driver 690 may be configured to handle Vulkan calls and may be referred to as a cross-platform graphics library display driver or simply as a Vulkan display driver. The resulting output may be captured in the copyback block 680 and sent back over the network to an image composition component 695 on the virtual compute instance 141B. The image composition for tracked windows 695 may draw the image in a window associated with the application 320. Alternatively, the output of executing the calls on the virtual GPU may be provided to another external component such as the client device 180A.

Figure 9:
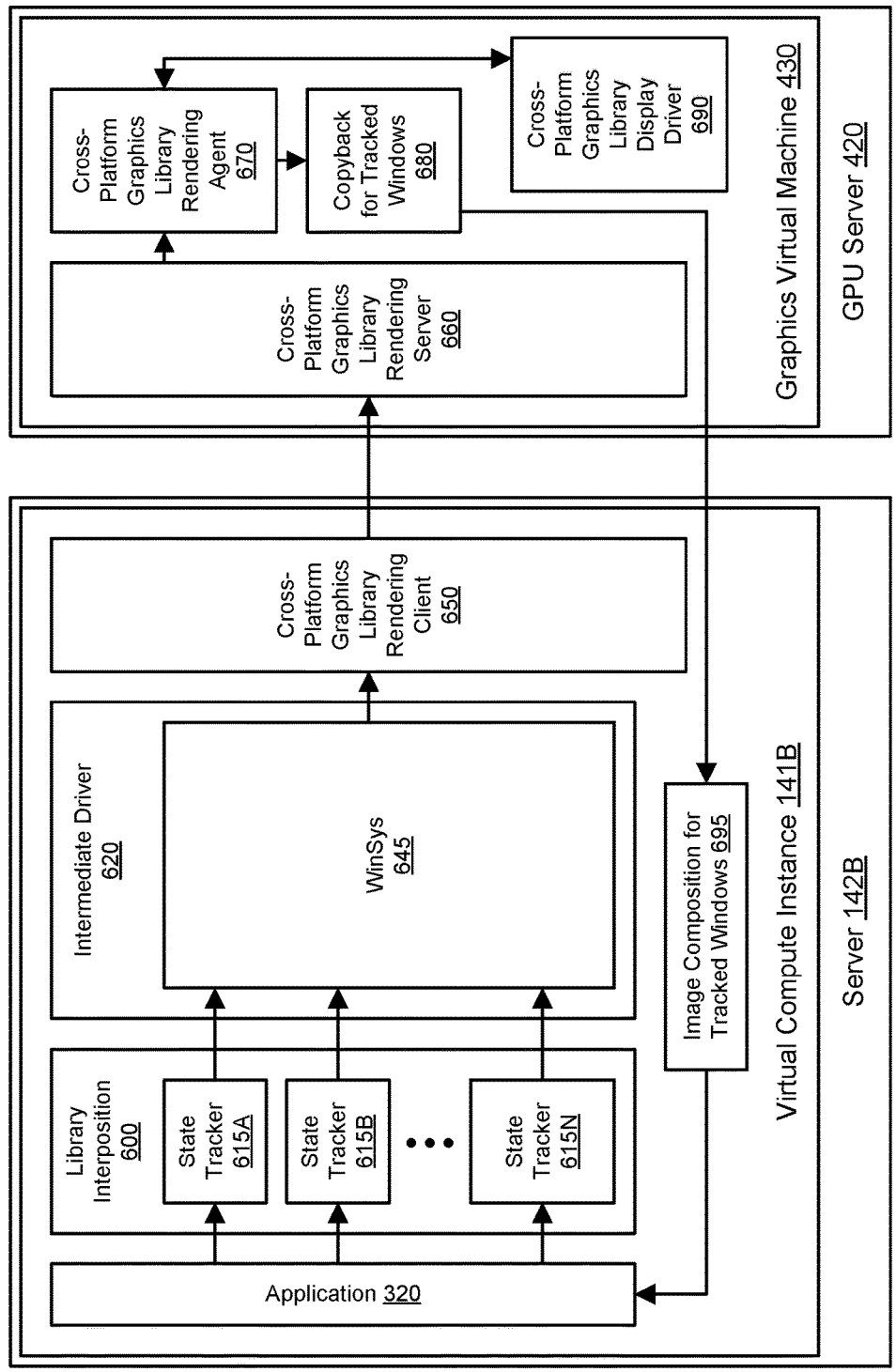
FIG. 9 illustrates further aspects of the example system environment for graphics library virtualization for virtualized graphics processing, including using state trackers for graphics libraries, according to one embodiment.

FIG. 9 illustrates further aspects of the example system environment for graphics library virtualization for virtualized graphics processing, including using state trackers for graphics libraries, according to one embodiment. In one embodiment, open-source components or other components acquired from an external source (e.g., an organization other than the one that provides the graphics library virtualization) may be used or adapted for use in the graphics library virtualization. For example, components associated with Gallium3D may be used in the library interposition 600 to assist in the virtualization. Gallium3D may represent a set of interfaces and a set of supporting libraries for development of device drivers on multiple operating systems and graphics APIs. Using a Gallium3D state tracker interface and a Gallium3D WinSys interface, device drivers may be split into multiple parts. Gallium3D may include a set of state trackers for various graphics libraries such as OpenGL and various versions of Direct3D. As shown in the example of FIG. 9, the state trackers 615A and 615B may represent state trackers for versions of Direct3D, and the state tracker 615N may represent a state tracker for OpenGL. The state trackers 615A-615N may implement the Gallium3D state tracker interface. A custom, platform-specific WynSys component 645 may implement the Gallium3D WinSys interface for compatibility with available Gallium3D hardware device drivers. The graphics commands collected by the state trackers 615A-615N may be sent to the WinSys component 645, which may then employ the cross-platform graphics library rendering to send the translated commands to the GPU server 420.

Figure 10:
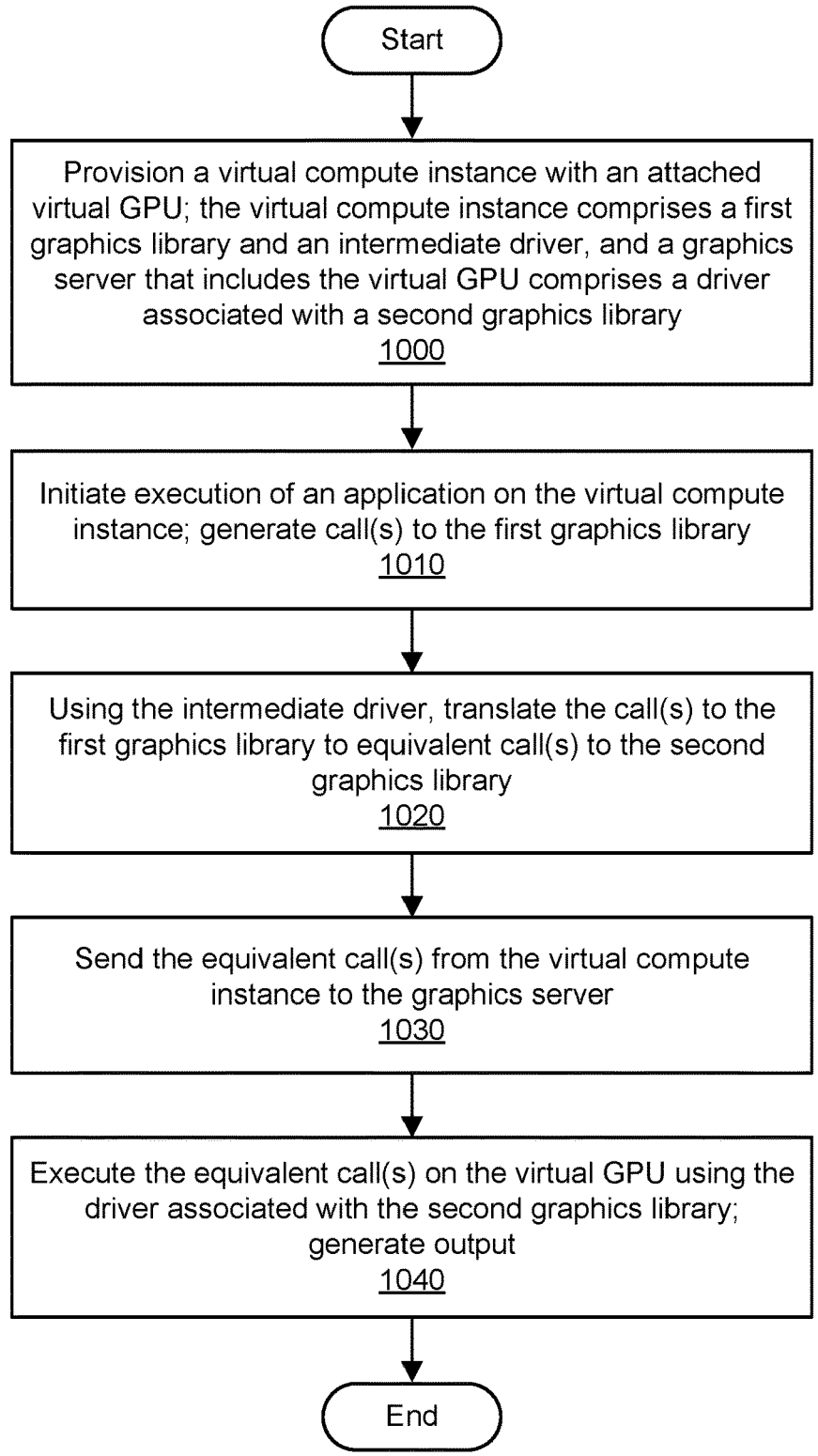
FIG. 10 is a flowchart illustrating a method for graphics library virtualization for virtualized graphics processing, according to one embodiment.

FIG. 10 is a flowchart illustrating a method for graphics library virtualization for virtualized graphics processing, according to one embodiment. As shown in 1000, a virtual compute instance may be provisioned with an attached virtual GPU. The virtual compute instance may be selected based (at least in part) on computational and memory resources provided by the virtual compute instance. For example, the virtual compute instance may be selected based (at least in part) on a selection of an instance type by a client. The virtual GPU may be selected based (at least in part) on graphics processing capabilities provided by the virtual GPU. For example, the virtual GPU may be selected based (at least in part) on a selection of a virtual GPU class by a client. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU. The elastic graphics service may interact with one or more other services or functionalities of a provider network, such as a compute virtualization functionality and/or GPU virtualization functionality, to provision the instance with the virtual GPU.

The virtual compute instance may be implemented using central processing unit (CPU) resources and memory resources of a server, also referred to as a physical compute instance. The virtual GPU may be implemented using a physical GPU in a GPU server. The physical GPU may be attached to or included in a different computing device (e.g., the GPU server) than the computing device that provides the CPU resources for the virtual compute instance. The physical GPU may be accessible to the server over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

The virtual compute instance may include one or more graphics libraries, such as a first graphics library. The first graphics library may include a set of graphics functions, calls, or commands that can be invoked by other software components on the virtual compute instance, such as an application. The first graphics library may offer a graphics application programming interface (API), and the first graphics library may sometimes be referred to as a graphics API. The first graphics library may be referred to as a local graphics library, in contrast to any graphics libraries associated with the remote GPU server. In one embodiment, the first graphics library may represent a version of Direct3D, such as Direct3D 9, Direct3D 10, Direct3D 11, and so on. In one embodiment, the first graphics library may represent a version of OpenGL. The first graphics library may be specific to a particular platform (e.g., to a particular operating system family) associated with the virtual compute instance and/or server.

The GPU server that includes the virtual GPU may include a driver associated with a second graphics library. The graphics library associated with the virtual GPU may represent a cross-platform graphics library, such as Vulkan, that is available on a variety of computing platforms (e.g., on different families of operating systems and/or different families of computing hardware). The graphics library associated with the GPU server and the virtual GPU may be referred to as a remote graphics library or a cross-platform graphics library. The set of functions offered by the first graphics library may differ (at least in part) from the set of functions offered by the second graphics library of the GPU server 420. However, many of the functions in the first graphics library may have equivalent functions in the second graphics library. The virtual compute instance may also include an intermediate driver that is configured to translate calls to the first graphics library to calls to the second graphics library. The virtual compute instance may include one or more additional graphics libraries, and the intermediate driver may also be configured to translate calls to the additional graphics libraries to calls to the second graphics library.

As shown in 1010, execution of an application may be initiated on the virtual compute instance. During execution, the application may issue one or more calls to the first graphics library. The application may issue the call(s) to invoke one or more of the functions offered by the first graphics library, e.g., for rendering elements of a scene or otherwise requesting graphics-related operation(s). The application may make the call(s) using any suitable APIs associated with the first graphics library.

As shown in 1020, the intermediate driver on the virtual compute instance may translate the call(s) associated with the first graphics library (such as Direct3D or OpenGL) to the equivalent call(s) associated with the second graphics library (such as the cross-platform Vulkan library). Equivalent functions or equivalent calls may represent functions or calls that typically produce the same or similar results even though the form of the call may differ. The intermediate driver may convert the call(s) from a form associated with the first graphics library to a form associated with the second graphics library.

As shown in 1030, the equivalent call(s) may be sent over a network from the server to the GPU server. In one embodiment, the equivalent call(s) (as expressed in the form associated with the second graphics library) may be serialized for transmission over the network between the two hosts. As shown in 1040, the equivalent call(s) (as expressed in the form associated with the second graphics library) may be executed using the virtual GPU in the GPU server. The equivalent call(s) may be executed using the driver associated with the second graphics library. Execution of the equivalent call(s) may generate output. The output may represent graphics output or non-graphics output, e.g., in the case of general-purpose GPU computing. The output may be provided to the virtual compute instance (e.g., for compositing in a window) or to another client device.

By utilizing graphics library virtualization in this manner, the GPU server may be implemented using any platform supported by the cross-platform graphics library while providing graphics processing (potentially including accelerated 2D graphics processing and/or accelerated 3D graphics processing) for an application host having one or more different (and potentially platform-specific) graphics libraries. The GPU server and application host may run different operating systems (e.g., operating systems from different families and/or different publishers) that support different graphics libraries. For example, the application host may run a version of the Windows operating system, and the application may call a Windows-specific Direct3D library, while the GPU server may run a version of the Linux operating system and use a driver for the cross-platform Vulkan graphics library. Virtualization of graphics libraries in an elastic graphics environment may permit greater flexibility in implementing both GPU servers and application hosts, e.g., in terms of operating system software and/or computing hardware.

Network-Optimized Graphics Library

Figure 11:
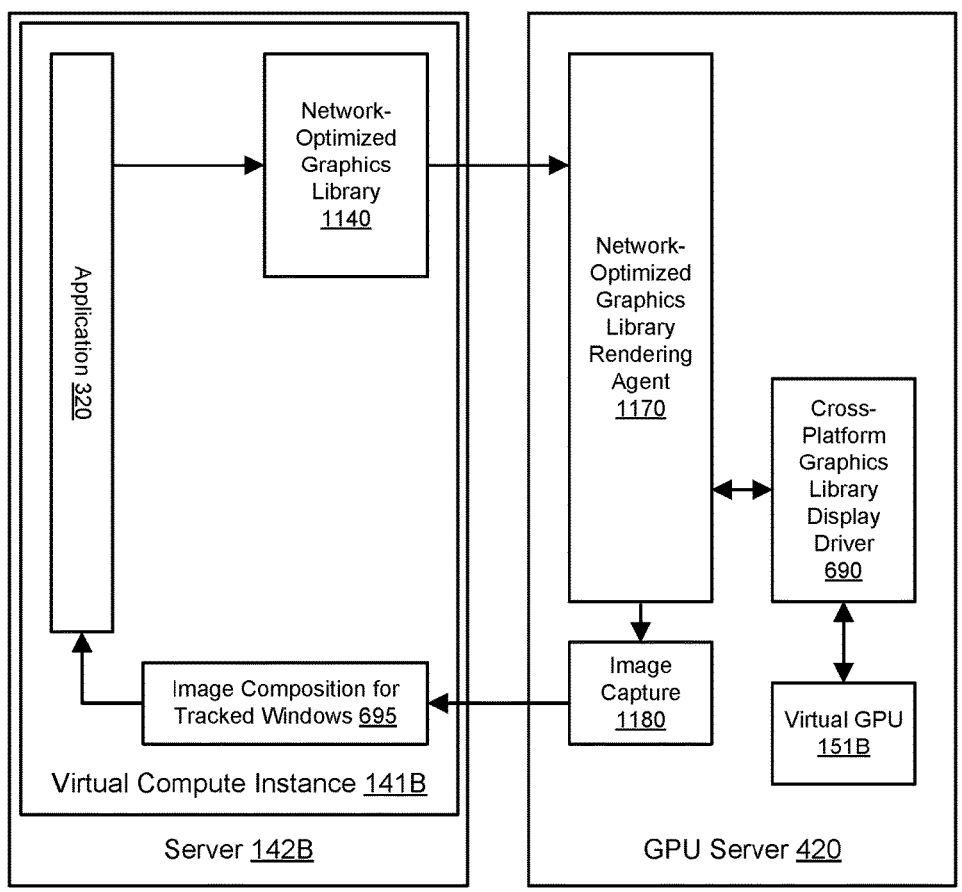
FIG. 11 illustrates an example system environment for a network-optimized graphics library for virtualized graphics processing, according to one embodiment.

FIG. 11 illustrates an example system environment for a network-optimized graphics library for virtualized graphics processing, according to one embodiment. In one embodiment, graphics commands may be transmitted to a GPU server 420 over a network using a network-optimized graphics library 1140. The network-optimized graphics library 1140 may provide a simple interface, modern features, and superior performance in a networked, virtualized graphics environment. The network-optimized graphics library 1140 may be a cross-platform library that is available for different families of operating systems and/or different families of computing hardware. The network-optimized graphics library may be usable for general-purpose GPU (GPGPU)

computing, e.g., by providing GLSL and/or SPIR-V support. In one embodiment, the network-optimized graphics library 1140 may represent a wrapper for an existing graphics library such as Vulkan or may otherwise be built on top of Vulkan. In one embodiment, the application programming interface (API) for the network-optimized graphics library 1140 may represent a simplified version of Vulkan that offers advantages associated with OpenGL. The network-optimized graphics library 1140 may be referred to as an intermediate graphics library, and a driver associated with the network-optimized graphics library may be referred to as a network-optimized driver or intermediate driver. The network-optimized graphics library 1140 may also be referred to as an elastic library in reference to its potential use in a graphics virtualization or elastic graphics environment.

As discussed above with respect to FIG. 1 through FIG. 5, a virtual compute instance 141B implemented on top of a server 142B may be provisioned with an attached virtual GPU 151B. The virtual GPU 151B may be included in a GPU server 420 that implements a graphics virtual machine 430. After the virtual compute instance 141B is provisioned with the attached virtual GPU 151B, the client device (e.g., device 180A) may use the provisioned instance and virtual GPU to perform any suitable tasks, e.g., based on input from the client device. For example, the virtual compute instance 141B may execute a particular application 320. The application 320 may be selected or provided by the client. The virtual compute instance 141B may also be configured with a particular operating system that provides support for the application 320.

Additionally, the virtual compute instance 141B may be configured with one or more graphics libraries. A graphics library may include a set of graphics functions, calls, or commands that can be invoked by other software components on the virtual compute instance 141B, such as one or more processes of the application 320. A graphics library may offer a graphics application programming interface (API), and a graphics library may sometimes be referred to as a graphics API. As shown in the example of FIG. 11, the virtual compute instance 141B may include a network-optimized, intermediate graphics library 1140. The term "graphics library" may include any set of functions, calls, or commands that are ultimately executed or implemented using a GPU, even if one or more of the functions, calls, or commands do not involve generating displayable output.

The GPU server 420 that includes the virtual GPU 151B may include a driver 690 associated with a different graphics library, such as Vulkan. The different graphics library may have a relatively slim interface and/or a limited set of functions, pipeline state objects, and command queues similar to those of its display driver 690. Such a graphics library local to the virtual GPU may represent a cross-platform graphics library that is available on a variety of computing platforms (e.g., on different families of operating systems and/or different families of computing hardware). The graphics library associated with the GPU server 420 and the virtual GPU 151B may be referred to as a remote graphics library, a target graphics library, or a cross-platform graphics library. The sets of functions offered by the network-optimized, intermediate graphics library 1140 may differ (at least in part) from the set of functions offered by the cross-platform or remote graphics library of the GPU server 420. However, many of the functions in the intermediate graphics library 1140 may have equivalent functions in the cross-platform or remote graphics library of the GPU server 420.

Calls from the application 320 to the intermediate graphics library 1140 may be held in a queue associated with a command buffer. The calls may be dispatched across the network from the application server 142B to the GPU server 420 in a manner than reduces network usage in comparison to serialization and transmission of one or more other graphics libraries, such as Vulkan. The calls may be received by a rendering agent 1170 associated with the intermediate graphics library 1140. At the GPU server 420, the calls may be translated from a form associated with the intermediate graphics library to equivalent calls in a form associated with the cross-platform graphics library (e.g., Vulkan) display driver 690. Equivalent functions or equivalent calls may represent functions or calls that typically produce the same or similar results even though the form of the call may differ. In one embodiment, state variables and object names may be stored on the client side, e.g., by the intermediate graphics library (or its associated driver) 1140.

The rendering agent 1170 may communicate with the display driver 690 to execute the calls, e.g., to render all or part of scene to a frame buffer bound to the application window. The display driver 690 may be configured to handle the translated (e.g., Vulkan) calls and may be referred to as a cross-platform graphics library display driver or simply as a Vulkan display driver. The resulting output may be captured in the image capture block 1180 and sent back over the network to an image composition component 695 on the virtual compute instance 141B. The image composition 695 may draw the image in a window associated with the application 320. Alternatively, the output of executing the calls on the virtual GPU may be provided to another external component such as the client device 180A. For a GPGPU implementation, the rendering agent 1170 may be referred to as a compute agent, and the compute agent may serve similar roles as the rendering agent.

Figure 12:
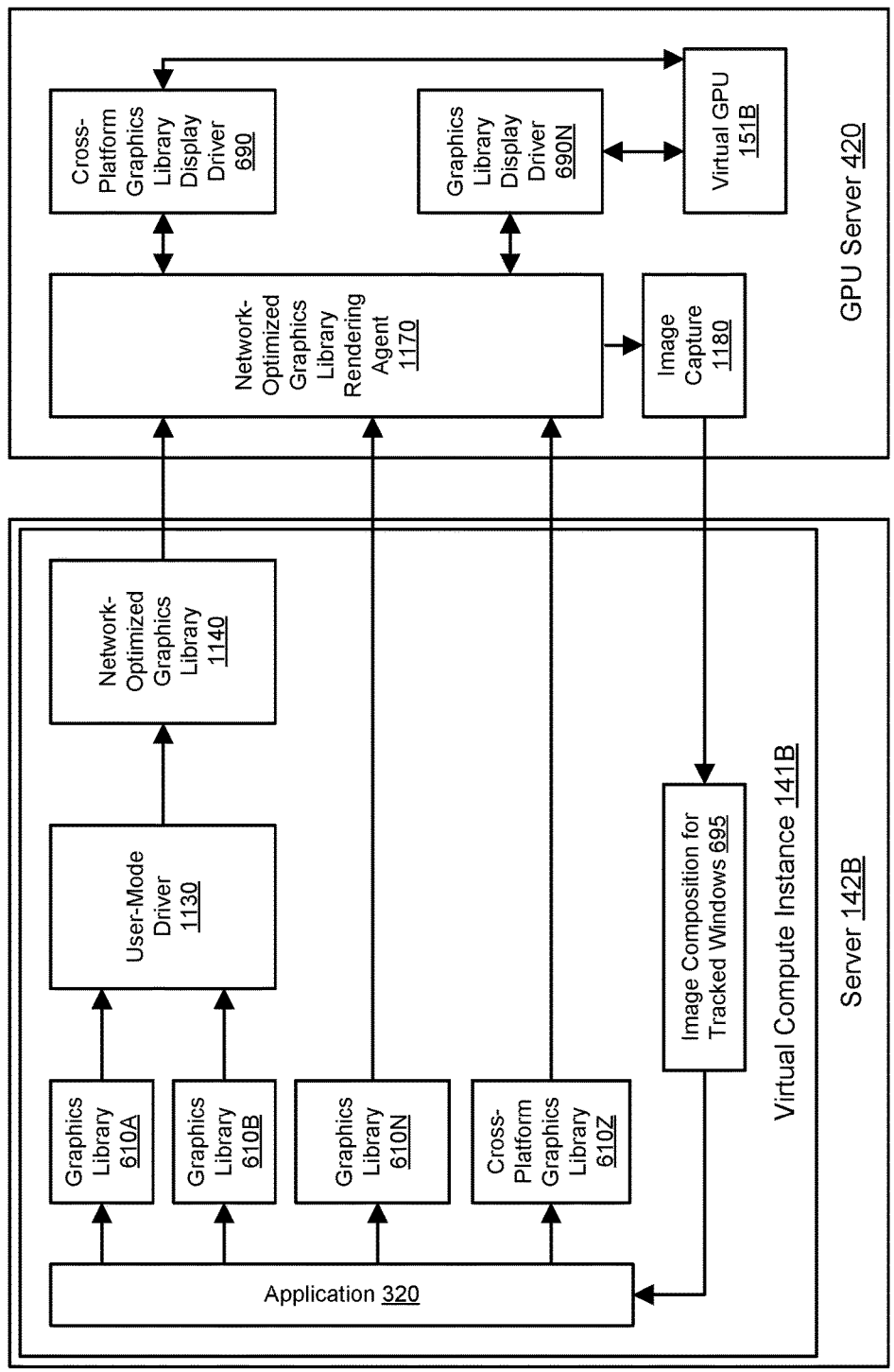
FIG. 12 illustrates further aspects of the example system environment for a network-optimized graphics library for virtualized graphics processing, including translation from a first graphics library to the intermediate library, according to one embodiment.

In one embodiment, as shown in FIG. 11, calls made by an application may be made directly to the network-optimized graphics library 1140, e.g., if the application is specifically written to make such calls. In one embodiment, as shown in FIG. 12, calls made by an application may be made instead to a different graphics library (e.g., OpenGL, Direct3D, Vulkan, OpenCL, CUDA, and so on) and then translated to a form associated with the network-optimized graphics library 1140 by an intermediate driver or other component on the application host. While expressed in the form associated with the intermediate library, the graphics calls may be serialized and sent over a network to the GPU server 420 in a manner that reduces network usage in comparison to other graphics libraries, such as Vulkan. For example, data structures may not be created and sent over the network as might be required by serialization of Vulkan commands. The calls may be held in a command buffer prior to being sent, e.g., in response to a command from the application to empty the buffer. The GPU server 420 that implements the virtual GPU may include a driver 690 associated with another graphics library, e.g., Vulkan. At the GPU server 420, the calls received over the network may be translated to equivalent calls in this other graphics library and may then be executed using the virtual GPU 151B. Equivalent functions or equivalent calls may represent functions or calls that typically produce the same or similar results even though the form of the call may differ. The translation may include the creation of data structures that were not passed over the network in order to conserve bandwidth, e.g., by the rendering agent 1170.

Figure 13:
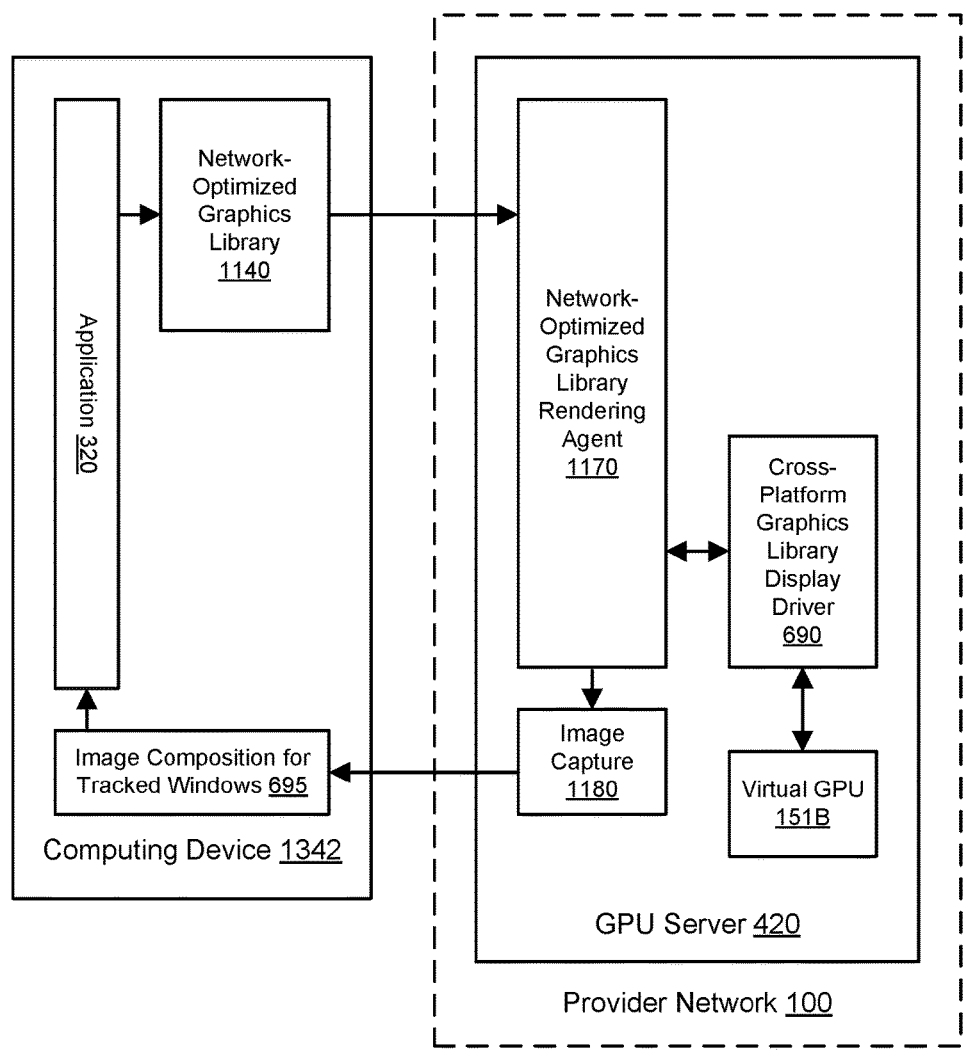
FIG. 13 illustrates further aspects of the example system environment for a network-optimized graphics library for virtualized graphics processing, including the use of a computing device external to the provider network, according to one embodiment.

The network-optimized graphics library 1140 may be used in a virtualization environment in which a computing device sends graphics commands (potentially including GPGPU commands) to a GPU server 420 over a network, and a virtual GPU 151B in the GPU server executes the commands and generates GPU output. The computing device that executes one or more applications associated with the graphics commands may also be referred to as an application host. The computing device that sends the commands using the network-optimized graphics library may include a virtual compute instance 141B that executes one or more applications whose execution is associated with the dispatched graphics commands. In one embodiment, the virtual compute instance 141B may be implemented using a server 142B in the same multi-tenant provider network that provides the virtual GPU. In one embodiment, as shown in FIG. 13, the application host may be external to a provider network 100 that provides the virtual GPU. In such a scenario, the computing device may represent any of a variety of devices such as a server, a desktop computer, a laptop computer, a smartphone, a tablet, a gaming console, a home automation device, a wearable computing device, and so on. By using the techniques described herein for implementing a network-optimized graphics library 1140 for virtualized graphics processing, GPU servers may be implemented using a powerful, cross-platform library such as Vulkan, application hosts may use any suitable graphics libraries as desired by application developers, and an intermediate graphics library may translate calls between the two devices for optimized network usage.

In one embodiment, the network-optimized graphics library 1140 may avoid the continuous creation and destruction of structures that may otherwise be needed using the Vulkan library. Using Vulkan, a programmer may be required to remember how to use all these structures, allocate them, call the functions, and release everything when finished. For example, using Vulkan, even the copying of a buffer from the CPU to the GPU may be a complex process that requires many instructions and structures, potentially including allocating a command buffer to execute the vkCmdCopyBuffer command, using a vkCommandBufferAllocateInfo structure, beginning the command buffer with a vkCommandBufferBeginInfo structure, submitting the command buffer to the queue with vkSubmitInfo, and creating a sync fence with vkFenceCreateInfo. To avoid such complexity, the network-optimized graphics library 1140 may eliminate the structures and use functions as in OpenGL. For example, arguments may be passed to functions for passing a buffer using the following example instructions:

uint32_t cmdPool=elGetDefaultCommandPool(device);
  uint32_t queue=elGetDefaultQueue(device);
  uint32_t copyCmd=0;
  elCreateCommandBuffers(device, cmdPool,
    EL_COMMAND_BUFFER_LEVEL_PRIMARY, 1, ©Cmd);
  elValidateCommandBuffers(device, 1, ©Cmd);
  elBeginCommandBuffer(copyCmd);
  elCmdCopyBuffer(copyCmd, sysVerticesBuffer, gpuVerticesBuffer, sysOffset, gpuOffset, size);
  elEndCommandBuffer(copyCmd);
  uint32_fence=0;
  elCreateFences(device, 1, &fence);
  elValidateFences(device, 1, &fence);
  elQueueSubmit(queue, fence, copyCmd);
  elWaitForFences(device, 1, &fence, true, MAX_TIMEOUT);
  elDestroyFences(device, 1, &fence);
  elFreeCommandBuffers(device, cmdPool, 1, ©Cmd);

Using such techniques, the network-optimized graphics library 1140 may be simpler to program and understand than a complex library such as Vulkan. The command buffer may be created with elCreateCommandBuffer passing the arguments to the function and then validated with elValidateCommandBuffer before usage. In one embodiment, setter functions may be called between the creation and the validation, or to set the parameters that cannot be passed as function arguments, like objects, resources and other kind of attachments. In the same way, the command buffer may be begun with elBeginCommandBuffer without extra parameters, but extra parameters may be added using special setter functions before the elBegin call. In one embodiment, the creation of the command pool or the queue may be avoided using the functions to get the default objects that can be used to perform basic functionality with default settings. A similar operation may be performed with the fence used for the synchronization. If the programmer has a single threaded process performing sync calls, like copybuffers, then using the following example instructions, the programmer may get a default fence that is global for the device used by all threads of the process:

uint32_t cmdPool=elGetDefaultCommandPool(device);
  uint32_t queue=elGetDefaultQueue(device);
  uint32_t copyCmd=elGetDefaultCommandBuffer(device);
  uint32_t fence=elGetDefaultFence(device);
  elBeginCommandBuffer(copyCmd);
  elCmdCopyBuffer(copyCmd, sysVerticesBuffer, gpuVerticesBuffer, sysOffset, gpuOffset, size);
  elEndCommandBuffer(copyCmd);
  elQueueSubmit(queue, fence, copyCmd);
  elWaitForFences(device, 1, &fence, true, MAX_TIMEOUT);

The programmer may also use the special version of the elCmdCopyBuffer call, according to the following example instructions, e.g., to perform the CPU to GPU copy with just one call and without having to create command buffers or other objects:

uint32_t fence=elGetDefaultFence(device);
  elCopyBuffer(device, fence, sysVerticesBuffer, gpuVerticesBuffer, sysOffset, gpuOffset, size);

The above example may represent a copy buffer implementation that is not only easier to program but also to serialize. A complex library such as Vulkan may have more functions, and the entire structures used by them may need to be serialized for network transmission. Using the network-optimized graphics library 1140, as in OpenGL, there may be fewer functions, and only the arguments that are passed inline may be serialized. In one embodiment, Vulkan functions may be translated into functions of the network-optimized graphics library 1140, thus avoiding the use of structures.

In one embodiment, the network-optimized graphics library 1140 may not provide support for rendering contexts but may instead support rendering states called devices. In libraries such as OpenGL, a rendering context may represent an object that stores all the resources and settings that are used for the rendering. A context can be made current to the calling thread, and the context may work in parallel by sharing resources with other contexts that are made current to other threads. The graphics pipeline may include multiple components and resources that may be shared between multiple threads without taking account of multiple contexts on different threads with different versions, resources, and internal states. Using the network-optimized graphics library 1140, these components may be untied and available for all the process threads, e.g., using a unique command queue that can be flushed with a mechanism of multithreading synchronization. In one embodiment, a process may use multiple display adapters that are enumerated and used to create a device or other suitable rendering state. The devices may be used to handle resources and command queues that may be dispatched to different display adapters. In one embodiment, a device may be created starting from a chosen adapter using the following example code:

```
uint32_t device;
elCreateDevice(chosenAdapter, &device);
elValidateDevice(chosenAdapter, device);
```

In one embodiment, the network-optimized graphics library 1140 may use default objects that are created when the device is validated. For example, the network-optimized graphics library 1140 may offer a default graphics pipeline with default vertex and fragment stages with default shaders attached to them. As another example, the network-optimized graphics library 1140 may offer a default render pass and a default framebuffer to perform the rendering, pushing the draw commands into a default command buffer that will be pushed into a default command queue. In one embodiment, a 3D object may be drawn using the network-optimized graphics library 1140 according to the following example instructions:

```
uint32_t commandpool=elGetDefaultCommandPool(device);
uint32_t pipeline=elGetDefaultGraphicsPipeline(device);
uint32_t renderpass=elGetDefaultRenderPass(device);
uint32_t framebuffer=elGetDefaultFramebuffer(device);
uint32_t commandbuffer=elGetDefaultCommandBuffer(device);
uint32_t queue=elGetDefaultCommandQueue(device);
uint32_t fence=elGetDefaultFence(device);
elBeginCommandBuffer(commandbuffer);
elCmdBeginRenderPassAddClearValue4f(commandbuffer, 0.0f, 0.0f, 0.2f, 1.0f);
elCmdBeginRenderPassAddClearValue1flui(commandbuffer, 1.0f, 0);
elCmdBeginRenderPass(commandbuffer, renderpass, framebuffer, 0, 0, width, height, EL_SUBPASS_CONTENTS_INLINE);
elCmdBindVertexBuffers(commandbuffer, 0, 1, &vertexBuffer, NULL);
elCmdBindIndexBuffers(commandbuffer, 0, 1, &indexBuffer, NULL);
elCmdDrawIndexed(commandbuffer, indicesCount, 1, 0, 0, 1);
elEndRenderPass(commandbuffer);
elEndCommandBuffer(commandbuffer);
elQueueSubmit(queue, fence);
elWaitForFences(device, 1, &fence, true, MAX_TIMEOUT);
```

Using default objects, a simple task may be achieved with a reduced amount of work. If greater functionality is needed, the programmer can create new objects and configure them for the desired features. For example, the previous example may be expanded by creating a graphics pipeline with a geometry stage instead of using the default one, or by creating multiple command buffers, fences, and semaphores to have better synchronization.

In one embodiment, the network-optimized graphics library 1140 may support attachments. A complex library such as Vulkan may have many functions that work with structures containing pointers to other structures, and so on. Serialization of such functions for network transmission may be inefficient. Instead the network-optimized graphics library 1140 may support objects that can be attached to other objects. For example, a framebuffer may have more than one image view attached to it. An image view may have an image attached to it which defines its content, and similar techniques may be used for vertex buffers, index buffers, and other kinds of resources. When a resource is destroyed, the same may happen for its internal attachments.

In one embodiment, the network-optimized graphics library 1140 may support instances. Instances may represent objects that store all the states modified by the application during the graphics library usage. In one embodiment, an instance may be required to call a graphics library function, to enumerate adapters, or to create devices. Functions that don't need graphics hardware to be performed may use only the instance and not the adapter or the device. For example, the adapters to create devices can be enumerated using just the instance, and similar techniques may be used for the surfaces used to present the rendered images into the application's window. Creation and validation of an instance may be performed simply using the following example instructions:

```
uint32_t instance;
elCreateInstance("This is a test", APP_VERSION, &instance);
elValidateInstance(instance);
```

In one embodiment, the network-optimized graphics library 1140 may support adapters. The adapter may indicate the display driver where the graphics commands will be addressed and then the hardware GPU. In the case where a system has multiple display adapters, a function like elGetNAdapters may be used to get the count of available adapters. In one embodiment, a function like elGetAdapters may be used to get the handles. In one embodiment, a function like elGetAdapterProperty may be used to get their properties. In one embodiment, one adapter may be used to create one or more devices that may implement a specific version and a set of extensions. Adapters may be used to get information to handle windows, surfaces, swap chains, and image composition. In one embodiment, the following example instructions may be used to enumerate the available display adapters for device creation; in this example, the adapter is selected based on the latest API version, but other selection criteria may also be used:

```
uint32_t adaptersCount;
uint32_t apiVersion;
uint32_t latestApiVersion=0;
uint32_t chosenAdapter=0;
elGetNAdapters(instance, &adaptersCount);
adapters=(uint32_t*)malloc(sizeof(uint32_t)*adaptersCount);
elGetAdapters(instance, adaptersCount, adapters);
for (uint32_t i=0; i<adaptersCount; i++) {
    elGetAdapterProperty_uiv(instance, adapters[i],
        EL_ADAPTER_API_VERSION, &apiVersion);
    if (apiVersion>latestApiVersion) {
        chosenAdapter=adapters[i];
        latestApiVersion=apiVersion;
    }
}
free(adapters);
if (chosenAdapter==0) {
    printf("No valid adapter has been found!");
    exit(1);
}
```

In one embodiment, the network-optimized graphics library 1140 may support versioning. The version may indicate the set of functions that will be available when the device is created. Typically, a higher version number implies that the functions of the previous versions will remain available. In one embodiment, the version may be obtained according to the following example instructions using a function like elGetAdapterProperty and passing the instance, the adapter, and a parameter like EL_ADAPTER_API_VERSION as arguments; the version may be a 32-bit integer formatted with the Vulkan version standard (e.g., the higher 10 bits for the major version, then 10 bits for the minor version, and the final 12 bits for the patch release):

uint32_t apiVersion;
    elGetAdapterProperty_uiv(instance, adapter, EL_ADAPTER_API_VERSION, &apiVersion);

In one embodiment, the network-optimized graphics library 1140 may support extensions. However, it is anticipated that the number of extensions to be supported may be far fewer than those associated with OpenGL, and thus the network-optimized graphics library 1140 may be used more efficiently. An extension may indicate additional features and functionality that may be present or not when the device is created by the adapter. The number of extensions may be obtained using a function like elGetAdapterProperty according to the following example code:

uint32_t apiExtensionsCount;
    elGetAdapterProperty_uiv(instance, adapter, EL_ADAPTER_API_EXTENSIONS_COUNT, &apiExtensionsCount);

In one embodiment, the extension string may be obtained with an indexed version of elGetAdapterProperty, passing the relative index:

char*extension=elGetAdapterProperty_String_i(instance, adapter, EL_ADAPTER_API_EXTENSION, i);

The main set of functions may belong only to versions of the network-optimized graphics library, and the use of extensions may be limited, e.g., to preview the hardware features that are not yet available in the current version or to communicate information useful for the application. In one embodiment, the extensions format may be the same as OpenGL, with a different prefix and a hardware vendor associated with the multi-tenant provider network that provides virtual GPUs.

In one embodiment, the network-optimized graphics library 1140 may support function pointers. When a device is created from a display adapter, it may be possible to get its functions with a function such as elGetDeviceProcAddress. If the functions belong to versions or extensions that are unsupported by the device, NULL may be returned. Functions not related to the device which are exposed by the instance may be obtained with a function such as elGetInstanceProcAddress.

In one embodiment, the network-optimized graphics library 1140 may support objects such as graphics pipelines and command buffers. The objects may be created by calling a creation function (e.g., elCreateGraphicsPipelines, elCreateCommandBuffers) that returns one or more object names. The object names may be simple, 32-bit integer numbers that can be shared between all the process threads. The objects may be ref-counted if they can be attached to other objects, and they can be destroyed with functions (e.g., elDestroyGraphicsPipelines, elDestroyCommandBuffers) that decrease the ref-count if the objects are attached. To avoid additional complexity, additional arguments may be set using setter functions (e.g., elGraphicsPipelineSetRasterizationState) to the object after its creation and before the validation that can be performed with a validate function (e.g., elValidateGraphicsPipeline, elValidateCommandBuffer). In one embodiment, an object that is not validated cannot be used. In one embodiment, the following example instructions may be used for these purposes during graphics pipeline creation:

uint32_t pipelineLayout;
    uint32_t pipeline;
    elCreatePipelineLayouts(device, 1, &pipelineLayout);
    elPipelineLayoutAddBinding(pipelineLayout,
        EL_DESCRIPTOR_TYPE_UNIFORM_BUFFER, 1,
        EL_SHADER_STAGE_VERTEX_BIT, nullptr);
    elValidatePipelineLayouts(device, 1, &pipelineLayout);
    elCreateGraphicsPipelines(device, pipelineLayout, renderPass, 1, &pipeline);
    elDestroyPipelineLayouts(device, 1, &pipelineLayout); // you can unref the pipeline layout here
    elGraphicsPipelineSetInputAssemblyState(pipeline,
        EL_PRIMITIVE_TOPOLOGY_TRIANGLE_LIST);
    elGraphicsPipelineSetRasterizationState(pipeline,
        EL_POLYGON_MODE_FILL, EL_CULL_MODE_NONE,
        EL_FRONT_FACE_COUNTER_CLOCKWISE,
        EL_FALSE,
        EL_FALSE, EL_FALSE, 1.0f);
    [ . . . ]
    elValidateGraphicsPipelines(device, 1, &pipeline);
    [ . . . ]
    // draw something until you have finished
    elDestroyPipelines(device, 1, &pipelineLayout); // pipeline and pipelineLayout will be destroyed In one embodiment, the network-optimized graphics library 1140 may support states. States may be temporary and used to pass information for the execution of commands that may need a wide range of arguments that cannot be passed to the function. Using Vulkan, these arguments may be passed using structures; e.g., a graphics pipeline may be created by passing the vkGraphicsPipelineCreateInfo structure to the vkCreateGraphicsPipelines function. To avoid passing such structures using the network-optimized graphics library 1140, temporary states may be set between the creation and validation of one or more objects. The default states may be designed to make the library able to complete basic 3D tasks such as rendering a 3D model. If the user wants to change some parameter of the objects or to add more information, the user may use appropriate setter functions (e.g., elGraphicsPipelineSetRasterizationState) using the following example instructions:

uint32_t multiPipelines[64];
    elCreatePipelineLayouts(device, 1, &pipelineLayout);
    elPipelineLayoutAddBinding(pipelineLayout,
        EL_DESCRIPTOR_TYPE_UNIFORM_BUFFER, 1,
        EL_SHADER_STAGE_VERTEX_BIT, NULL);
    elValidatePipelineLayouts(device, 1, &pipelineLayout);
    elCreateGraphicsPipelines(device, pipelineLayout, renderPass, 64, multiPipelines);
    elDestroyPipelineLayouts(device, 1, &pipelineLayout); // you can unref the pipeline layout here
    elGraphicsPipelineSetInputAssemblyState(multiPipelines[0],
        EL_PRIMITIVE_TOPOLOGY_TRIANGLE_LIST);
    elGraphicsPipelineSetRasterizationState(multiPipelines[0],
        EL_POLYGON_MODE_FILL, EL_CULL_MODE_NONE,
        EL_FRONT_FACE_COUNTER_CLOCKWISE,
        EL_FALSE,
        EL_FALSE, EL_FALSE, 1.0f);

```
elGraphicsPipelineAddColorBlendState(multiPipelines
    [0], 0xf, EL_FALSE);
[ . . . ]// add more states
elValidateGraphicsPipelines(device, 64, multiPipelines);
```

In one embodiment, the validate function may use the states of the first object in the array (the states of other objects, if set, may be ignored by this call). To create multiple objects on different arrays and with the same states, the internal states may be copied from one object to another object with a function like elCopyStates while the objects are still not validated, e.g., to avoid redundant calls between object creation and validation. In one embodiment, this operation may be performed using the following example instructions:

```
uint32_t pipeline;
uint32_t multiPipelines[64];
elCreatePipelineLayouts(device, 1, &pipelineLayout);
elPipelineLayoutAddBinding(pipelineLayout,
    EL_DESCRIPTOR_TYPE_UNIFORM_BUFFER, 1,
    EL_SHADER_STAGE_VERTEX_BIT, NULL);
elValidatePipelineLayouts(device, 1, &pipelineLayout);
elCreateGraphicsPipelines(device, pipelineLayout, renderPass, 1, &pipeline);
elCreateGraphicsPipelines(device, pipelineLayout, renderPass, 64, multiPipelines);
elDestroyPipelineLayouts(device, 1, &pipelineLayout); // you can unref the pipeline layout here
elGraphicsPipelineSetInputAssemblyState(pipeline,
    EL_PRIMITIVE_TOPOLOGY_TRIANGLE_LIST);
elGraphicsPipelineSetRasterizationState(pipeline,
    EL_POLYGON_MODE_FILL,  EL_CULL_MODE_NONE,
    EL_FRONT_FACE_COUNTER_CLOCKWISE,
    EL_FALSE,
    EL_FALSE, EL_FALSE, 1.0f);
elGraphicsPipelineAddColorBlendState(pipeline, 0xf,
    EL_FALSE);
[ . . . ]// add more states
elGraphicsPipelineCopyStates(device, pipeline, 64, multiPipelines);
elValidateGraphicsPipelines(device, 1, &pipeline);
elValidateGraphicsPipelines(device, 64, multiPipelines);
```

In this manner, the user may avoid creating and setting again the multiPipelines[0] object, thereby saving calls. The states may also be used for other functions that may require a wide range of arguments, such as elBeginCommandBuffer or elCmdBeginRenderPass. The states may be used and flushed when the relative function is called for that object. If multiple objects should be considered by a single call, then the states of the first object may be considered, and otherwise the states may be copied using the elCopyStates function.

In one embodiment, the network-optimized graphics library 1140 may support attachments. A complex library like Vulkan may be full of functions that work with structures containing pointers to other structures, and so on. This complexity may make such a library difficult to understand for developers and may cause difficulty in serialization of such functions. To mitigate such problems, the network-optimized graphics library may support objects that can be attached to other objects. For example, a framebuffer may have more than one image attached to it. As another example, an image may have a buffer attached to it which defines its content, and a similar approach may be used for vertex buffers, index buffers, and any other kind of resources. In one embodiment, when a resource is destroyed, its internal attachments may also be destroyed.

In one embodiment, the network-optimized graphics library 1140 may support render passes. A render pass may represent a collection of attachments, subpasses, and dependencies and may describe how the attachments are used over the course of the subpasses. In one embodiment, render passes may be created with greater simplicity using the network-optimized graphics library 1140 than with a complex library like Vulkan. For example, a render pass may be created using the following example instructions:

```
elCreateRenderPasses(device, 1, &renderPass);
elRenderPassAddAttachment(renderPass,  swapChain.
    colorFormat,
    EL_SAMPLE_COUNT_1_BIT,
    EL_ATTACHMENT_LOAD_OP_CLEAR,
    EL_ATTACHMENT_STORE_OP_STORE,
    EL_ATTACHMENT_LOAD_OP_DONT_CARE,
    EL_ATTACHMENT_STORE_OP_DONT_CARE,
    EL_IMAGE_LAYOUT_UNDEFINED,
    EL_IMAGE_LAYOUT_PRESENT_SRC);
elRenderPassAddAttachment(renderPass, depthFormat,
    EL_SAMPLE_COUNT_1_BIT,
    EL_ATTACHMENT_LOAD_OP_CLEAR,
    EL_ATTACHMENT_STORE_OP_STORE,
    EL_ATTACHMENT_LOAD_OP_DONT_CARE,
    EL_ATTACHMENT_STORE_OP_DONT_CARE,
    EL_IMAGE_LAYOUT_UNDEFINED,
EL_IMAGE_LAYOUT_DEPTH_STENCIL_ATTACHMENT_OPTIMAL); // optional (if not specified, the graphics library can create a basic subpass to produce an output anyway, considering the render pass attachments):
{
    elCreateSubpasses(device,  EL_PIPELINE_BIND_POINT_GRAPHICS, 1, &subpass);
    elSubpassAddColorAttachmentsReference(subpass, 0,
        EL_IMAGE_LAYOUT_COLOR_ATTACHMENT_OPTIMAL);
    elSubpassSetDepthStencilAttachmentReference(subpass, 1,
EL_IMAGE_LAYOUT_DEPTH_STENCIL_ATTACHMENT_OPTIMAL);
    elValidateSubpasses(device, 1, &subpass);
    elRenderPassAddSubpass(device, renderPass, subpass);
}
// optional (if not specified, the graphics librsary can create basic dependencies to produce an output anyway, considering the render pass attachments):
{
    elRenderPassAddDependency(renderPass,
        EL_SUBPASS_EXTERNAL, 0,
        EL_PIPELINE_STAGE_BOTTOM_OF_PIPE_BIT,
        EL_PIPELINE_STAGE_COLOR_ATTACHMENT_OUTPUT_BIT,
        EL_ACCESS_MEMORY_READ_BIT,
        EL_ACCESS_COLOR_ATTACHMENT_READ_BIT|
        EL_ACCESS_COLOR_ATTACHMENT_WRITE_BIT,
        EL_DEPENDENCY_BY_REGION_BIT);
    elRenderPassAddDependency(renderPass, 0,
        EL_SUBPASS_EXTERNAL,
        EL_PIPELINE_STAGE_COLOR_ATTACHMENT_OUTPUT_BIT,
        EL_PIPELINE_STAGE_BOTTOM_OF_PIPE_BIT,
```

EL_ACCESS_COLOR_ATTACHMENT_READ_
BIT|
EL_ACCESS_COLOR_ATTACHMENT_WRITE_
BIT,
EL_ACCESS_MEMORY_READ_BIT,
EL_DEPENDENCY_BY_REGION_BIT);
}
elValidateRenderPasses(device, 1, &renderPass);

In one embodiment, the network-optimized graphics library 1140 may support images. An image may represent a multidimensional (e.g., up to 3) array of data which can be used for various purposes (e.g., attachments or textures) by binding them to a graphics or compute pipeline via descriptor sets or by specifying them as parameters to commands. Because images contain data stores, a complex library such as Vulkan may require creation, allocation, and binding the data to image objects. In one embodiment, images may be used with greater simplicity using the network-optimized graphics library 1140 than with a complex library like Vulkan. Using the network-optimized graphics library 1140, the programmer may specify whether the library has to allocate and bind the data required by the images by specifying the flag EL_IMAGE_MEMORY_ALLOWED. Instead the flag may be set to 0, and the required memory may be allocated with a function such as elAllocateMemory and bound to the image object with a function such as elBindImageMemory. For example, an image may be created using the following example instructions:

elCreateImages(device, width, height, 1, depthFormat, 1, 1,
        EL_SAMPLE_COUNT_1_BIT,
        EL_IMAGE_TILING_OPTIMAL,
        EL_IMAGE_USAGE_DEPTH_STENCIL_ATTACHMENT_BIT|
        EL_IMAGE_USAGE_TRANSFER_SRC_BIT,
        EL_IMAGE_LAYOUT_UNDEFINED,
        EL_IMAGE_MEMORY_ALLOCATED,
        1, &depthStencil.image);
    elValidateImages(device, 1, &depthStencil.image);

In one embodiment, the network-optimized graphics library 1140 may support image views. Image objects may not be directly accessed by pipeline shaders for reading and writing image data. Instead, image views representing contiguous ranges of the image subresources and containing additional metadata may be used for that purpose. Views may be created on images of compatible types and may represent a valid subset of image subresources. For example, an image view may be created using the following example instructions:

elCreateImageViews(device,
        EL_IMAGE_VIEW_TYPE_2D, depthFormat,
        EL_IMAGE_ASPECT_DEPTH_BIT|EL_IMAGE_ASPECT_STENCIL_BIT,
        0, 1, 0, 1, depthStencil.image, 1, &depthStencil.view);
    elValidateImageViews(device, 1, &depthStencil.view);

In one embodiment, the network-optimized graphics library 1140 may support framebuffers. Render passes may operate in conjunction with framebuffers. Framebuffers may represent a collection of specific memory attachments (e.g., image views) that a render pass instance uses. It may represent a container of the images that will be read or written during graphics command execution to produce the final output of a scene. For example, a framebuffer may be created using the following example instructions:

uint32_t framebuffer;
    elCreateFramebuffers(device, width, height, 1, renderpass, 1, &framebuffer);
    elFramebufferAddAttachment(device, colorView);
    elFramebufferAddAttachment(device, depthStencilView);
    elValidateFramebuffers(device, 1, &framebuffer);

In one embodiment, the network-optimized graphics library 1140 may support graphics pipelines. Graphics pipelines may include multiple shader stages in which vertices and images are processed by the GPU to produce the rendering output. The states and the shader attached to each stage of the pipeline may determine how the rendering is performed. A strict set of states, like viewport or blend, may change dynamically during the command buffer execution. For example, a graphics pipeline may be created using the following example instructions in a much simpler manner than in a complex library such as Vulkan:

elCreatePipelineLayouts(device, 1, &pipelineLayout);
    elPipelineLayoutAddBinding(pipelineLayout,
        EL_DESCRIPTOR_TYPE_UNIFORM_BUFFER, 1,
        EL_SHADER_STAGE_VERTEX_BIT, NULL);
    elValidatePipelineLayouts(device, 1, &pipelineLayout);
    elCreateGraphicsPipelines(device, pipelineLayout, renderPass, 1, &pipeline);
    elGraphicsPipelineSetInputAssemblyState(pipeline,
        EL_PRIMITIVE_TOPOLOGY_TRIANGLE_LIST);
    elGraphicsPipelineSetRasterizationState(pipeline,
        EL_POLYGON_MODE_FILL, EL_CULL_MODE_NONE,
        EL_FRONT_FACE_COUNTER_CLOCKWISE,
        EL_FALSE, EL_FALSE, EL_FALSE, 1.0f);
    elGraphicsPipelineAddColorBlendState(pipeline, 0xf,
        EL_FALSE);
    elGraphicsPipelineAddViewportState(pipeline, 0, 0, 0, 0);
    elGraphicsPipelineAddScissorState(pipeline, 0, 0, 0, 0);
    elGraphicsPipelineAddDynamicState(pipeline,
        EL_DYNAMIC_STATE_VIEWPORT);
    elGraphicsPipelineAddDynamicState(pipeline,
        EL_DYNAMIC_STATE_SCISSOR);
    elGraphicsPipelineSetDepthStencilState(pipeline,
        EL_TRUE, EL_TRUE,
        EL_COMPARE_OP_LESS_OR_EQUAL,
        EL_FALSE,
        EL_STENCIL_OP_KEEP, EL_STENCIL_OP_KEEP,
        EL_COMPARE_OP_ALWAYS, EL_STENCIL_OP_KEEP,
        EL_STENCIL_OP_KEEP, EL_COMPARE_OP_ALWAYS,
        EL_FALSE);
    elGraphicsPipelineSetMultisampleState(pipeline,
        EL_SAMPLE_COUNT_1_BIT, NULL);
    elGraphicsPipelineAddVertexBinding(pipeline, 0, sizeof(Vertex),
        EL_VERTEX_INPUT_RATE_VERTEX);
    elGraphicsPipelineAddVertexAttribute(pipeline, 0, 0,
        EL_FORMAT_R32G32B32_SFLOAT, offsetof(Vertex, position));
    elGraphicsPipelineAddVertexAttribute(pipeline, 0, 1,
        EL_FORMAT_R32G32B32_SFLOAT, offsetof(Vertex, color));
    elGraphicsPipelineAddSPIRVShaderStage(pipeline,
        EL_SHADER_STAGE_VERTEX_BIT,
        loadSPIRVShader(getAssetPath( )+
        "shaders/triangle.vert.spv"), "main");
    elGraphicsPipelineAddSPIRVShaderStage(pipeline,
        EL_SHADER_STAGE_FRAGMENT_BIT, loadSPIRVShader(getAssetPath( )+
"shaders/triangle.frag.spv"), "main");
elValidateGraphicsPipelines(device, 1, &pipeline);

In one embodiment, the network-optimized graphics library 1140 may support command buffers. Command buffers may represent objects used to record commands which can be subsequently submitted to a device queue for execution. In one embodiment, a command buffer may be executed only if a framebuffer and a graphics pipeline is bound to it. Once it is created, the command pipeline may be queued multiple times to perform different iterations of the same rendering model. The aspect of this model may be changed to modify the buffers in the device memory and the shader parameters stored in the Uniform Buffer Object.

FIG. 12 illustrates further aspects of the example system environment for a network-optimized graphics library for virtualized graphics processing, including translation from a first graphics library to the intermediate library, according to one embodiment. As discussed above, calls made by an application 320 may be made to a graphics library (e.g., OpenGL, Direct3D, Vulkan, OpenCL, CUDA, and so on) other than the network-optimized, intermediate graphics library 1140. For example, as shown in FIG. 12, graphics libraries 610A and 610B may represent versions of Direct3D, graphics library 610N may represent a version of OpenGL, and the cross-platform graphics library 610Z may represent Vulkan. The calls to one or more of these libraries may be intercepted and translated to a form associated with the network-optimized graphics library 1140 prior to transmission over the network. In one embodiment, the calls may be translated by an intermediate driver (such as user-mode driver 1130) or other component on the application host 142B. A rendering agent 1170 associated with the network-optimized graphics library 1140 may receive the calls as optimized for network transmission and assist in their translation, e.g., to a form associated with the cross-platform graphics library (e.g., Vulkan) for execution using the associated driver 690. The GPU server 420 may also include another driver 690N, e.g., as associated with OpenGL, and the calls received from the virtual compute instance 141B may instead be translated to another form for use by the driver 690N. In one embodiment, the network-optimized graphics library 1140 may be used in place of the abstraction layer 640 shown in FIG. 6.

FIG. 13 illustrates further aspects of the example system environment for a network-optimized graphics library for virtualized graphics processing, including the use of a computing device external to the provider network, according to one embodiment. In one embodiment, the computing device 1342 that executes the application 320 may be external to a provider network 100 that provides the virtual GPU. In such a scenario, the computing device 1342 may represent any of a variety of devices such as a server, a desktop computer, a laptop computer, a smartphone, a tablet, a gaming console, a home automation device, a wearable computing device, and so on. The network-optimized graphics library 1140 may be distributed by an appropriate vendor and installed on the computing device 1342, and the application 320 may be specifically written to take advantage of the functionality and network optimization of the network-optimized graphics library 1140. Using the network-optimized graphics library 1140, calls to the virtual GPU 151B may be serialized and dispatched across a network from the computing device 1342 to the GPU server 420 in a manner that reduces network bandwidth in comparison to the potential serialization and transmission of calls associated with other graphics libraries, e.g., Vulkan.

Figure 14:
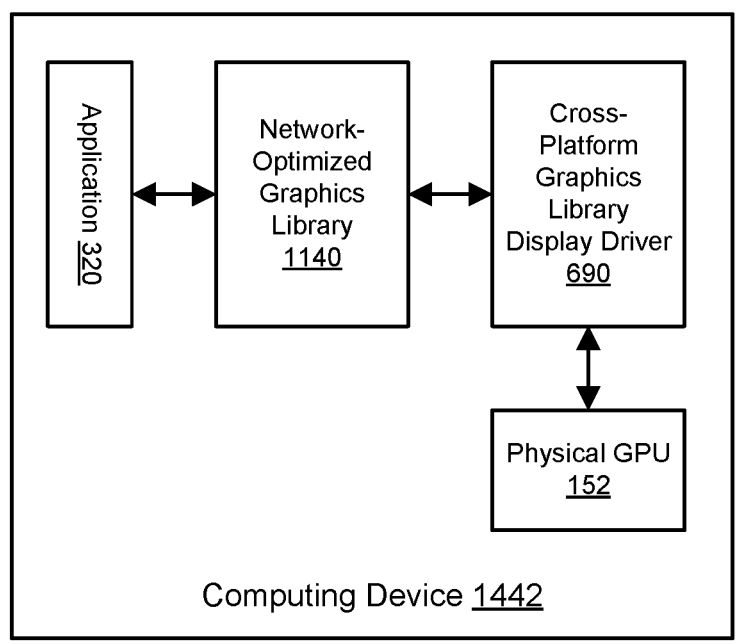
FIG. 14 illustrates further aspects of the example system environment for a network-optimized graphics library for virtualized graphics processing, including the use of a computing device with its own GPU, according to one embodiment.

FIG. 14 illustrates further aspects of the example system environment for a network-optimized graphics library for virtualized graphics processing, including the use of a computing device with its own GPU, according to one embodiment. In one embodiment, the network-optimized graphics library 1140 may be used in a computing device 1442 that includes its own physical GPU 152 and does not necessarily take advantage of network-accessible graphics virtualization. The network-optimized graphics library 1140 may be distributed by an appropriate vendor and installed on the computing device 1442, and the application 320 may be specifically written to take advantage of the functionality and network optimization of the network-optimized graphics library 1140. At the computing device 1442, calls may be translated from the form associated with the network-optimized graphics library 1140 to a form associated with the cross-platform graphics library display driver 690 and then executed using the local GPU 152. For example, the network-optimized graphics library 1140 may represent a wrapper to a cross-platform library such as Vulkan and may simplify the use of that cross-platform library by the application 320.

Figure 15A:
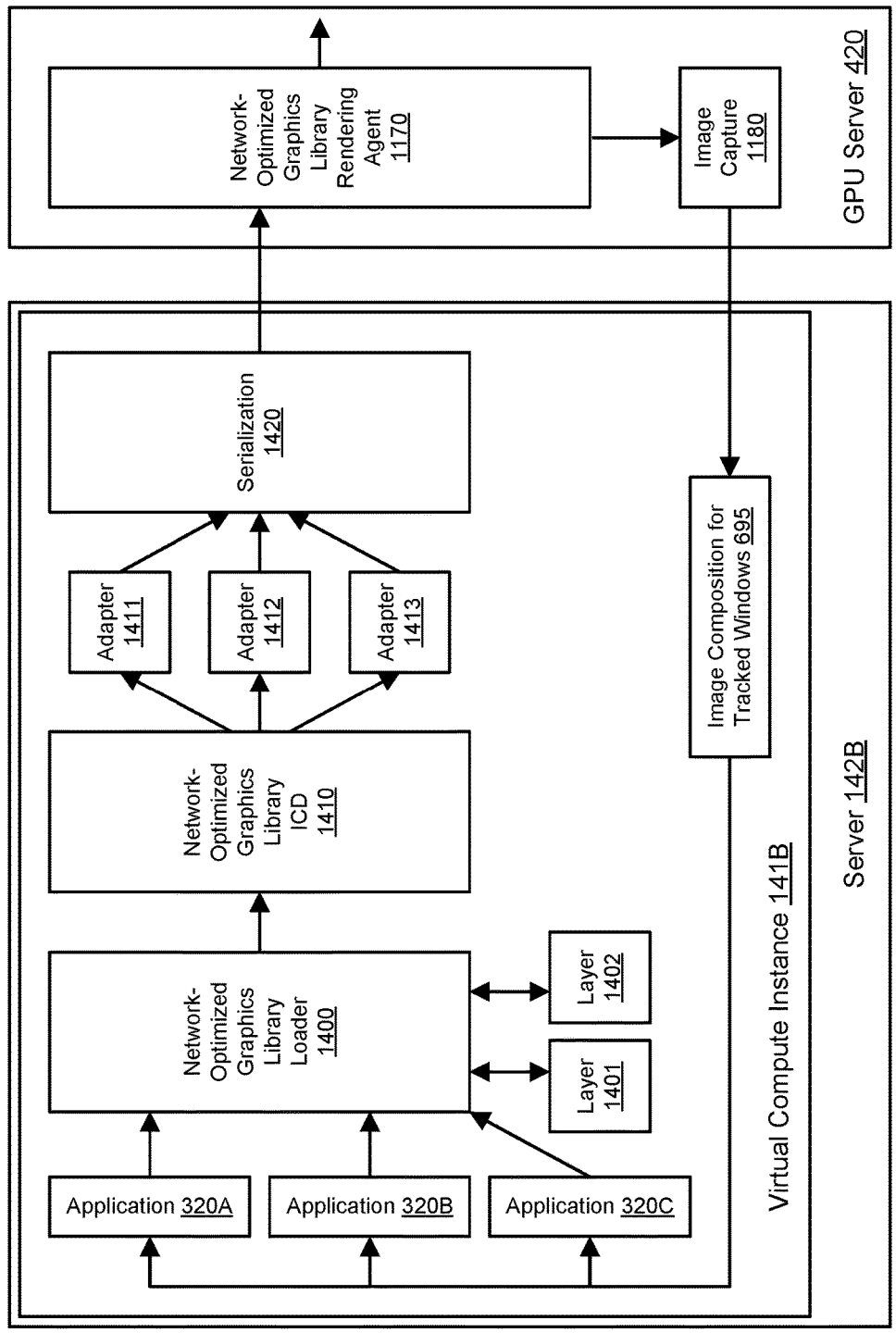
FIG. 15A and FIG. 15B illustrate further aspects of the example system environment for a network-optimized graphics library for virtualized graphics processing, including the use of a loader and an installable client driver (ICD), according to one embodiment.
Figure 15B:
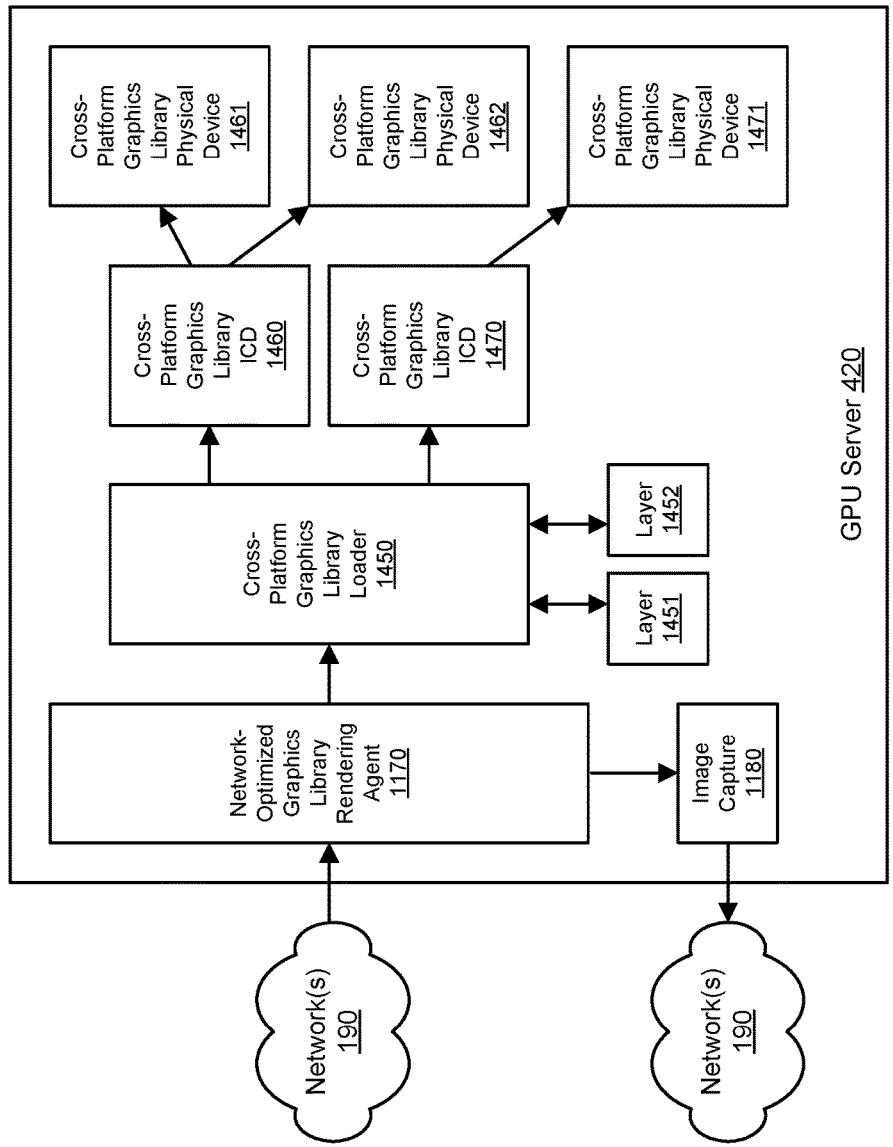

FIG. 15A and FIG. 15B illustrate further aspects of the example system environment for a network-optimized graphics library for virtualized graphics processing, including the use of a loader and an installable client driver (ICD), according to one embodiment. In one embodiment, the network-optimized graphics library 1140 may include an implementation usable with the physical GPU, where commands are translated to a cross-platform graphics library such as Vulkan. The graphics library 1140 may enumerate the available adapters which are exposed by the installable client drivers (ICDs) on that computing device. The network-optimized graphics library 1140 may be used with a library loaded with its own ICDs for translating from the network-optimized graphics library 1140 to a cross-platform graphics library such as Vulkan. In Vulkan, a dynamic library known as a loader may contain an interface to load the ICDs, enumerate the adapters, and get their functions' pointers.

In the example of FIG. 15A and FIG. 15B, an ICD 1410 associated with the network-optimized graphics library 1140 may create one adapter (e.g., adapters 1411, 1412, and 1413) corresponding to each physical device (e.g., devices 1461, 1462, and 1471) associated with the cross-platform graphics library on the GPU server 420. The adapters may be collected and returned by the network-optimized graphics library loader 1400 to the applications (e.g., applications 320A, 320B, and 320C). When an application decides to use one of the adapters, the graphics calls may be translated and executed by the corresponding physical device on the GPU server 420. If there are multiple network-optimized graphics library ICDs installed on the same computing device, then the available adapters may be the sum of all the ICDs' adapters. Serialization 1420 may be performed for transmission across the network to the GPU server 420. As also shown in the example of FIG. 15A and FIG. 15B, validation layers may be implemented using layers 1401 and 1402 for the network-optimized graphics library loader 1400 and layers 1451 and 1452 for the cross-platform graphics library loader 1450. The layers 1401 and 1402 may represent implicit layers (set with registry keys during installation) and explicit layers (set by the application process with the library API). The explicit layers may be set between the creation and validation of the instance. Additionally, in the example of FIG. 15B, the cross-platform graphics library loader 1450 may use two ICDs 1460 and 1470 to create the physical devices 1461, 1462, and 1463.

Figure 16:
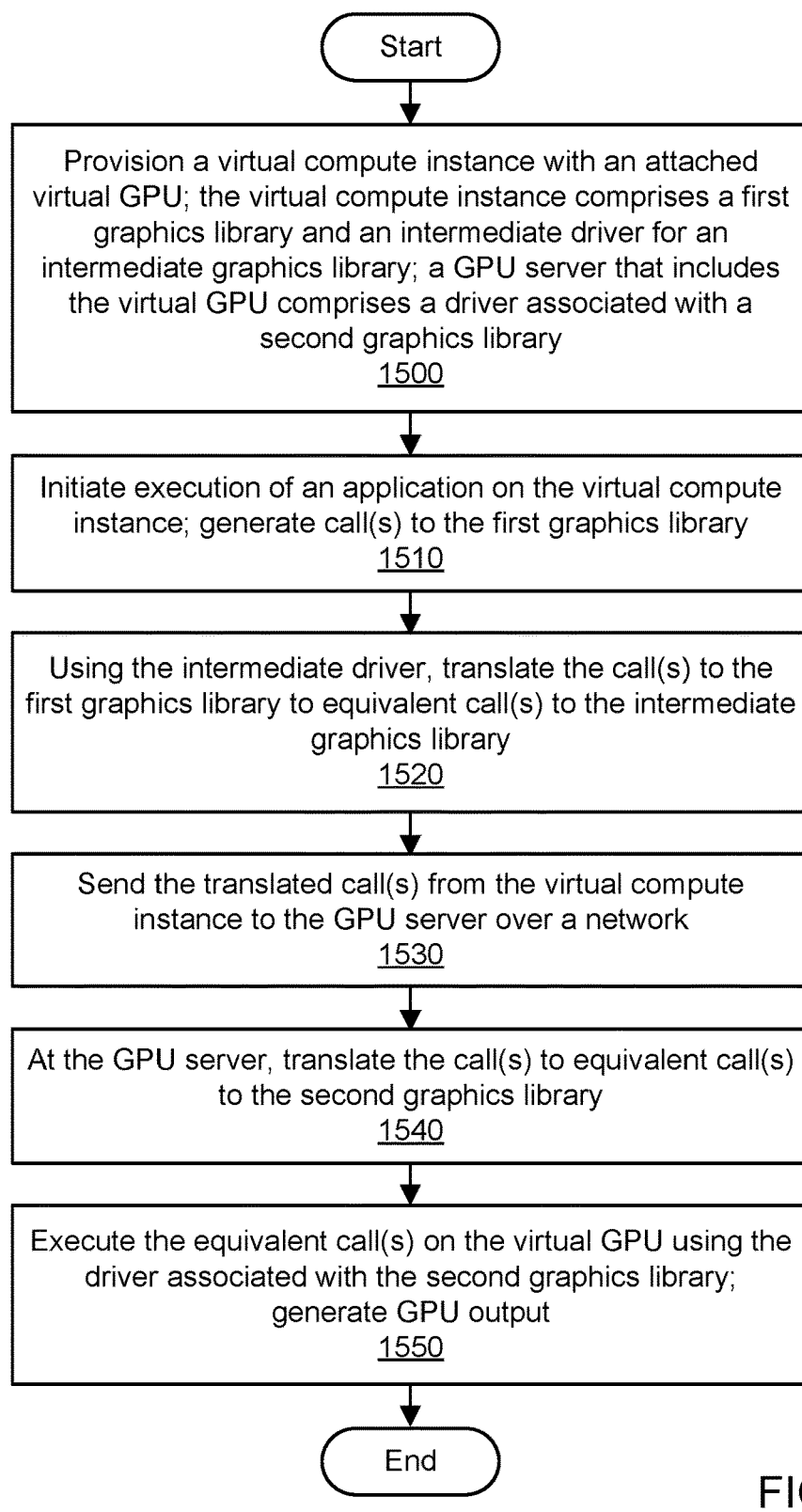
FIG. 16 is a flowchart illustrating a method for using a network-optimized graphics library for virtualized graphics processing, according to one embodiment.

FIG. 16 is a flowchart illustrating a method for using a network-optimized graphics library for virtualized graphics processing, according to one embodiment. As shown in 1500, a virtual compute instance may be provisioned with an attached virtual GPU. The virtual compute instance may be selected based (at least in part) on computational and memory resources provided by the virtual compute instance. For example, the virtual compute instance may be selected based (at least in part) on a selection of an instance type by a client. The virtual GPU may be selected based (at least in part) on graphics processing capabilities provided by the virtual GPU. For example, the virtual GPU may be selected based (at least in part) on a selection of a virtual GPU class by a client. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU. The elastic graphics service may interact with one or more other services or functionalities of a provider network, such as a compute virtualization functionality and/or GPU virtualization functionality, to provision the instance with the virtual GPU.

The virtual compute instance may be implemented using central processing unit (CPU) resources and memory resources of a server, also referred to as a physical compute instance. The virtual GPU may be implemented using a physical GPU in a GPU server. The physical GPU may be attached to or included in a different computing device (e.g., the GPU server) than the computing device that provides the CPU resources for the virtual compute instance. The physical GPU may be accessible to the server over a network. The GPU server may be implemented using resources of a multi-tenant provider network. The virtual compute instance may also be implemented using resources of the multi-tenant provider network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

The virtual compute instance may include one or more graphics libraries, such as a first graphics library and a network-optimized, intermediate graphics library. The first graphics library may include a set of graphics functions, calls, or commands that can be invoked by other software components on the virtual compute instance, such as an application. The first graphics library may offer a graphics application programming interface (API), and the first graphics library may be referred to as a graphics API. In one embodiment, the first graphics library may represent a version of Direct3D, such as Direct3D 9, Direct3D 10, Direct3D 11, and so on. In one embodiment, the first graphics library may represent a version of OpenGL. In one embodiment, the first graphics library may represent a version of Vulkan. The first graphics library may be specific to a particular platform (e.g., to a particular operating system family) associated with the virtual compute instance and/or the underlying server.

The intermediate library may be associated with an intermediate driver on the virtual compute instance. The intermediate driver may be configured to translate calls to the first graphics library to calls to the intermediate graphics library for optimized transmission of such calls across a network. As used herein, terms such as "optimized" and "optimization" refer to improvement in one or more qualities or metrics (e.g., reduction of network bandwidth). The virtual compute instance may also include one or more additional graphics libraries, and the intermediate driver may also be configured to translate calls to the additional graphics libraries to calls to the intermediate graphics library.

The GPU server that includes the virtual GPU may include a driver associated with a second graphics library. The graphics library associated with the virtual GPU may represent a cross-platform graphics library, such as Vulkan, that is available on a variety of computing platforms (e.g., on different families of operating systems and/or different families of computing hardware). The graphics library associated with the GPU server and the virtual GPU may be referred to as a remote graphics library or a cross-platform graphics library. The set of functions offered by the first graphics library may differ (at least in part) from the set of functions offered by the second graphics library of the GPU server 420. However, many of the functions in the first graphics library may have equivalent functions in the second graphics library. Similarly, the set of functions offered by the intermediate graphics library may differ (at least in part) from the sets of functions offered by the first and second graphics libraries.

As shown in 1510, execution of an application may be initiated on the virtual compute instance. During execution, the application may issue one or more calls to the first graphics library. The application may issue the call(s) to invoke one or more of the functions offered by the first graphics library, e.g., for rendering elements of a scene or otherwise requesting graphics-related operation(s). The application may make the call(s) using any suitable APIs associated with the first graphics library.

As shown in 1520, the intermediate driver on the virtual compute instance may translate the call(s) associated with the first graphics library (such as Direct3D or OpenGL) to the equivalent call(s) associated with the network-optimized, intermediate graphics library. Equivalent functions or equivalent calls may represent functions or calls that typically produce the same or similar results even though the form of the call may differ. The intermediate driver may convert the call(s) from a form associated with the first graphics library to a form associated with the intermediate graphics library.

As shown in 1530, the equivalent call(s) may be sent over a network from the server to the GPU server. In one embodiment, the equivalent call(s) (as expressed in the form associated with the intermediate graphics library) may be serialized for transmission over the network between the two hosts. While expressed in the form associated with the intermediate library, the calls may be serialized and sent over a network in a manner that reduces network usage in comparison to other graphics libraries, such as Vulkan. The calls may be held in a command buffer prior to being sent. As shown in 1540, the call(s) associated with the network-optimized, intermediate graphics library may be translated at the GPU server to one or more equivalent calls to the second graphics library. The translation may include the creation of data structures that were not passed over the network in order to conserve bandwidth.

As shown in 1550, the equivalent call(s) (as expressed in the form associated with the second graphics library) may be executed using the virtual GPU in the GPU server. The equivalent call(s) may be executed using the driver associated with the second graphics library. Execution of the equivalent call(s) may generate GPU output. The output may represent graphics output or non-graphics output, e.g., in the case of general-purpose GPU computing. The output may be provided to the virtual compute instance (e.g., for compositing in a window) or to another client device. Using the techniques discussed with reference to FIG. 16, the GPU server may be implemented using a powerful, cross-platform library such as Vulkan, the computing devices may use any suitable graphics libraries as desired by application developers, and an intermediate graphics library may translate calls between the two devices for optimized network usage.

Illustrative Computer System

In at least some embodiments, a computer system that implements a portion or all of one or more of the technologies described herein may include a computer system that includes or is configured to access one or more computer-readable media. FIG. 17 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a virtual compute instance, wherein the virtual compute instance is implemented using central processing unit (CPU) resources and memory resources of a server, wherein the virtual compute instance is provided by a multi-tenant provider network, wherein the virtual compute instance comprises a first graphics library comprising a first set of graphics functions, and wherein the virtual compute instance comprises an intermediate driver configured to translate calls to the first set of graphics functions to calls to an intermediate set of graphics functions; and
   a virtual graphics processing unit (GPU) attached to the virtual compute instance over a network, wherein the virtual GPU is implemented using a physical GPU of a GPU server, wherein the virtual GPU is provided by the multi-tenant provider network, wherein the virtual GPU implements a second set of graphics functions associated with a second graphics library and wherein the intermediate set of graphics functions differs at least in part from the first set of graphics functions and from the second set of graphics functions;
   wherein the virtual compute instance executes an application, wherein the application issues one or more calls to the first graphics library, wherein the intermediate driver translates the one or more calls to one or more intermediate calls to the intermediate graphics library, wherein the virtual compute instance sends the one or more intermediate calls to the GPU server over the network, wherein the GPU server translates the one or more intermediate calls to one or more equivalent calls to the second graphics library, wherein the virtual GPU executes the one or more equivalent calls using a driver associated with the second graphics library, and wherein the virtual GPU generates graphics output based at least in part on execution of the one or more equivalent calls.

2. The system as recited in claim 1, wherein the intermediate driver is associated with a queue, wherein the one or more intermediate calls are placed in one or more command buffers in the queue, and wherein the one or more command buffers in the queue are serialized and sent to the GPU server over the network based at least in part on a command from the application.

3. The system as recited in claim 1, wherein the GPU server generates one or more data structures associated with the one or more equivalent calls in a format associated with the second graphics library.

4. The system as recited in claim 1, wherein the virtual compute instance comprises a third graphics library comprising a third set of graphics functions, wherein the intermediate driver is configured to translate calls to the third set of graphics functions to calls to the intermediate set of graphics functions, wherein the third set of graphics functions differs at least in part from the first and second sets of graphics functions and from the intermediate set of graphics functions, wherein the virtual compute instance executes an additional application, wherein the additional application issues an additional one or more calls to the third graphics library, wherein the intermediate driver translates the additional one or more calls to an additional one or more intermediate calls, wherein the virtual compute instance sends the additional one or more intermediate calls to the GPU server over the network, wherein the GPU server translates the additional one or more intermediate calls to an additional one or more equivalent calls to the second graphics library, wherein the virtual GPU executes the additional one or more equivalent calls using the driver associated with the second graphics library, and wherein the virtual GPU generates additional graphics output based at least in part on execution of the additional one or more equivalent calls.

5. A computer-implemented method, comprising:
   initiating execution of an application on a computing device, wherein a virtual graphics processing unit (GPU) is attached to the computing device over a network, wherein the virtual GPU is implemented using a physical GPU of a GPU server in a multi-tenant provider network, wherein the computing device comprises an intermediate driver associated with an intermediate graphics library, and wherein one or more calls to the intermediate graphics library are associated with the execution of the application;
   sending the one or more calls from the intermediate driver to the GPU server over the network;
   translating, at the GPU server, the one or more calls to one or more equivalent calls to a second graphics library, wherein the second graphics library differs at least in part from the intermediate graphics library; and
   executing the one or more equivalent calls on the virtual GPU using a driver associated with the second graphics library, wherein GPU output is generated based at least in part on execution of the one or more equivalent calls.

6. The method as recited in claim 5, wherein the computing device comprises a first graphics library, wherein the first graphics library differs at least in part from the intermediate graphics library, and wherein the method further comprises:
  translating, at the computing device, one or more preliminary calls by the application to the first graphics library to the one or more calls to the intermediate graphics library.

7. The method as recited in claim 6, wherein the computing device comprises a third graphics library, wherein the third graphics library differs at least in part from the intermediate graphics library, and wherein the method further comprises:
  initiating execution of an additional application on the computing device, wherein an additional one or more preliminary calls to the third graphics library are associated with the execution of the additional application;
  translating, at the computing device, the additional one or more preliminary calls to the third graphics library to one or more intermediate calls to the intermediate graphics library;
  sending the one or more intermediate calls from the intermediate driver to the GPU server over the network;
  translating, at the GPU server, the one or more intermediate calls to an additional one or more equivalent calls to the second graphics library; and
  executing the additional one or more equivalent calls on the virtual GPU using the driver associated with the second graphics library, wherein additional GPU output is generated based at least in part on execution of the additional one or more equivalent calls.

8. The method as recited in claim 5, wherein the intermediate driver is associated with a queue, wherein the one or more calls are placed in one or more command buffers in the queue, and wherein sending the one or more calls from the intermediate driver to the GPU server over the network comprises sending the one or more command buffers in the queue.

9. The method as recited in claim 5, further comprising:
  generating, at the GPU server, one or more data structures associated with the one or more equivalent calls in a format associated with the second graphics library.

10. The method as recited in claim 5, wherein the computing device implements a virtual compute instance in the multi-tenant provider network, and wherein the application is executed by the virtual compute instance.

11. The method as recited in claim 5, wherein the computing device is external to the multi-tenant provider network.

12. The method as recited in claim 5, wherein the one or more calls to the intermediate graphics library are issued by the application without invoking another graphics library.

13. The method as recited in claim 5, wherein the computing device runs a first operating system, and wherein the GPU server runs a second operating system from a different publisher than the first operating system.

14. A non-transitory computer-readable storage medium storing program instructions computer-executable to perform: initiating execution of an application on a virtual compute instance in a multi-tenant provider network, wherein a virtual graphics processing unit (GPU) is attached to the virtual compute instance over a network, wherein the virtual GPU is implemented using a physical GPU of a GPU server in the multi-tenant provider network, wherein the virtual compute instance comprises an intermediate driver associated with an intermediate graphics library, and wherein one or more calls to the intermediate graphics library are associated with the execution of the application; sending the one or more calls from the intermediate driver to the GPU server over the network; translating, at the GPU server, the one or more calls to one or more equivalent calls to a second graphics library, wherein the second graphics library differs at least in part from the intermediate graphics library; and executing the one or more equivalent calls on the virtual GPU using a driver associated with the second graphics library, wherein GPU output is generated based at least in part on execution of the one or more equivalent calls.

15. The non-transitory computer-readable storage medium as recited in claim 14, wherein the virtual compute instance comprises a first graphics library, wherein the first graphics library differs at least in part from the intermediate graphics library, and wherein the program instructions are further computer-executable to perform: translating, at the virtual compute instance, one or more preliminary calls by the application to the first graphics library to the one or more calls to the intermediate graphics library.

16. The non-transitory computer-readable storage medium as recited in claim 15, wherein the virtual compute instance comprises a third graphics library, wherein the third graphics library differs at least in part from the intermediate graphics library, and wherein the program instructions are further computer-executable to perform: initiating execution of an additional application on the virtual compute instance, wherein an additional one or more preliminary calls to the third graphics library are associated with the execution of the additional application; translating, at the virtual compute instance, the additional one or more preliminary calls to the third graphics library to one or more intermediate calls to the intermediate graphics library; sending the one or more intermediate calls from the intermediate driver to the GPU server over the network; translating, at the GPU server, the one or more intermediate calls to an additional one or more equivalent calls to the second graphics library; and executing the additional one or more equivalent calls on the virtual GPU using the driver associated with the second graphics library, wherein additional GPU output is generated based at least in part on execution of the additional one or more equivalent calls.

17. The non-transitory computer-readable storage medium as recited in claim 14, wherein the intermediate driver is associated with a queue, wherein the one or more calls are placed in one or more command buffers in the queue, and wherein sending the one or more calls from the intermediate driver to the GPU server over the network comprises sending the one or more command buffers in the queue.

18. The non-transitory computer-readable storage medium as recited in claim 14, wherein the program instructions are further computer-executable to perform: generating, at the GPU server, one or more data structures associated with the one or more equivalent calls in a format associated with the second graphics library.

19. The non-transitory computer-readable storage medium as recited in claim 14, wherein the one or more calls to the intermediate graphics library are issued by the application without invoking another graphics library.

20. The non-transitory computer-readable storage medium as recited in claim 14, wherein the virtual compute instance runs a first operating system, and wherein the GPU server runs a second operating system from a different publisher than the first operating system.

\* \* \* \* \*